(12) United States Patent
Chmiel et al.

(10) Patent No.: US 8,824,533 B2
(45) Date of Patent: Sep. 2, 2014

(54) METHODS, APPARATUSES, SYSTEM AND RELATED COMPUTER PROGRAM PRODUCT FOR CELL TYPE DETECTION

(75) Inventors: Mieszko Chmiel, Wroclaw (PL); Juergen Michel, Munich (DE); Bernhard Raaf, Neuried (DE)

(73) Assignee: Nokia Siemens Networks Oy, Espoo (FI)

( * ) Notice: Subject to any disclaimer, the term of this patent is extended or adjusted under 35 U.S.C. 154(b) by 120 days.

(21) Appl. No.: 13/000,719

(22) PCT Filed: Jun. 24, 2008

(86) PCT No.: PCT/EP2008/058014
§ 371 (c)(1),
(2), (4) Date: Feb. 7, 2011

(87) PCT Pub. No.: WO2009/155967
PCT Pub. Date: Dec. 30, 2009

(65) Prior Publication Data
US 2011/0129008 A1 Jun. 2, 2011

(51) Int. Cl.
*H04L 27/06* (2006.01)
*H04W 48/10* (2009.01)
(Continued)

(52) U.S. Cl.
CPC ........... *H04W 48/10* (2013.01); *H04J 11/0073* (2013.01); *H04W 84/045* (2013.01)
USPC ............................. 375/224; 375/302; 375/324

(58) Field of Classification Search
CPC ... H04L 5/0007; H04L 5/0053; H04L 5/0016; H04L 5/0037; H04L 5/005; H04L 5/0073; H04L 27/2613; H04L 27/2656; H04L 27/2675; H04L 1/0071; H04W 72/042; H04W 72/005; H04W 48/12; H04W 84/04; H04B 1/7073
USPC .................................................. 370/254–340
See application file for complete search history.

(56) References Cited

U.S. PATENT DOCUMENTS 8,515,472 B2 * 8/2013 Han et al. ....................... 455/500
(Continued)

FOREIGN PATENT DOCUMENTS

CN 101146336 A 3/2008
(Continued)

OTHER PUBLICATIONS

Qualcomm Europe; "Restricted Association for HNBs"; 3GPP TSG-RAN WG2 Meeting #59bis, R2-074406; Oct. 8, 2007; whole document (6 pages); Shanghai, China.
(Continued)

*Primary Examiner* — Ayaz Sheikh
*Assistant Examiner* — Debebe Asefa
(74) *Attorney, Agent, or Firm* — Harrington & Smith

(57) ABSTRACT

It is disclosed a method including transmitting indication information indicating network cells of a first type different from network cells of a second type, the transmitting including a) broadcasting control information, the indication information to be transmitted being an indication flag, b) assigning a set of synchronization information to the network cells of the first type, and broadcasting control information, the indication information to be transmitted being the synchronization information, c) reserving at least one signaling code information for the network cells of the first type, the indication information to be transmitted being the signaling code information, d) transmitting signaling information subjected to modulation by at least one predefined phase modulation or scrambling by at least one predefined scrambling sequence, the modulation or scrambling being indicative of network cells of the first and second types, and/or e) transmitting i) a PSS and a RS, ii) a SSS and a RS, or iii) a PSS and a SSS, the PSS/RS, SSS/RS or PSS/SSS having at least one predefined phase relation to each other, the at least one phase relation being indicative of the network cells of the first and second types.

62 Claims, 11 Drawing Sheets

(51) Int. Cl.
*H04J 11/00* (2006.01)
*H04B 17/00* (2006.01)
*H04L 27/12* (2006.01)
*H04W 84/04* (2009.01)

(56) References Cited

U.S. PATENT DOCUMENTS

| | | | |
|---|---|---|---|
| 2007/0268853 A1 | 11/2007 | Ma et al. | |
| 2008/0117866 A1 | 5/2008 | Claussen et al. | |
| 2010/0091907 A1* | 4/2010 | Noh et al. | 375/302 |

FOREIGN PATENT DOCUMENTS

| | | |
|---|---|---|
| JP | 2007-336499 A | 12/2007 |
| WO | WO-2008/038979 A2 | 4/2008 |
| WO | WO 2008055251 A2 * | 5/2008 |

OTHER PUBLICATIONS

Nokia Corporation et al.; "CSG Cell Identification for Mobility and Measurement Reporting"; 3GPP TSG-RAN WG2 Meeting #59bis, R2-073920; Oct. 8, 2007; whole document (2 pages); Shanghai, China.

NTT Docomo, Inc.; "Cell ID Assignment for Home Node B"; 3GPP TSG-RAN WG2 Meeting #59, R2-073374; Aug. 20, 2007; whole document (4 pages); Athens, Greece.

3GPP TS 36.211 V8.3.0 (May 2008), "3rd Generation Partnership Project; Technical Specification Group Radio Access Network; Evolved Universal Terrestrial Radio Access (E-UTRA); Physical Channels and Modulation (Release 8)", 79 pgs.

3GPP TS 36.211 V8.2.0 (Mar. 2008), $31^{rd}$ Generation Partnership Project; Technical Specification Group Radio Access Network; Evolved Universal Terrestrial Radio Access (E-UTRA); Physical channels and Modulation (Release 8):, 67 pgs.

* cited by examiner

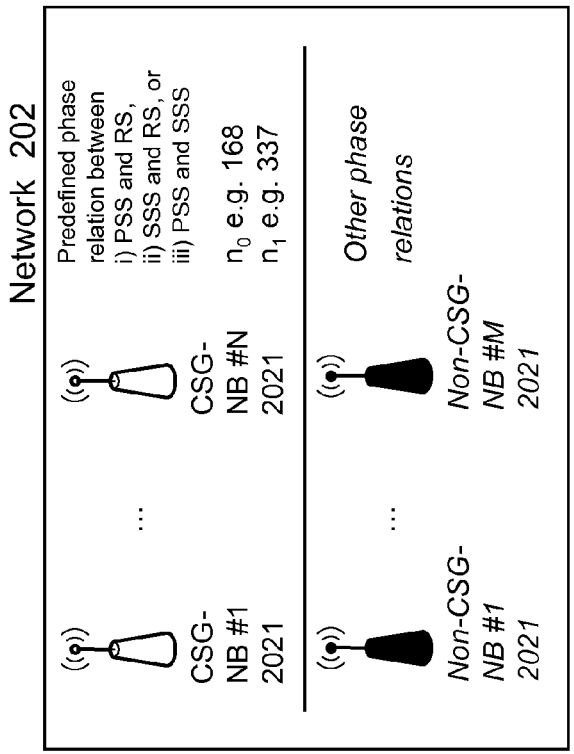
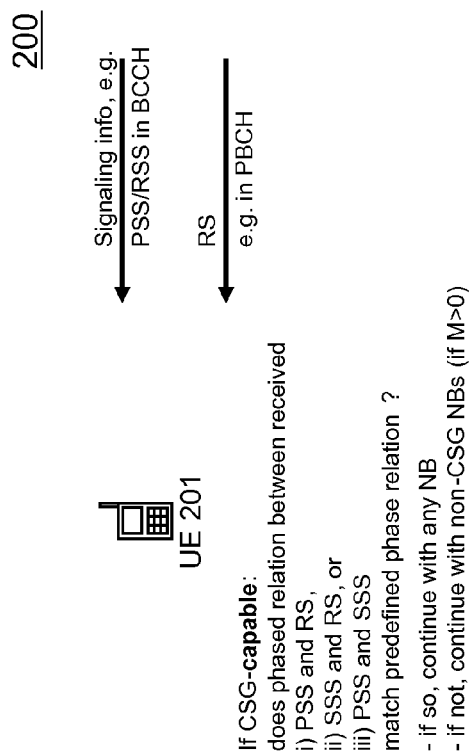

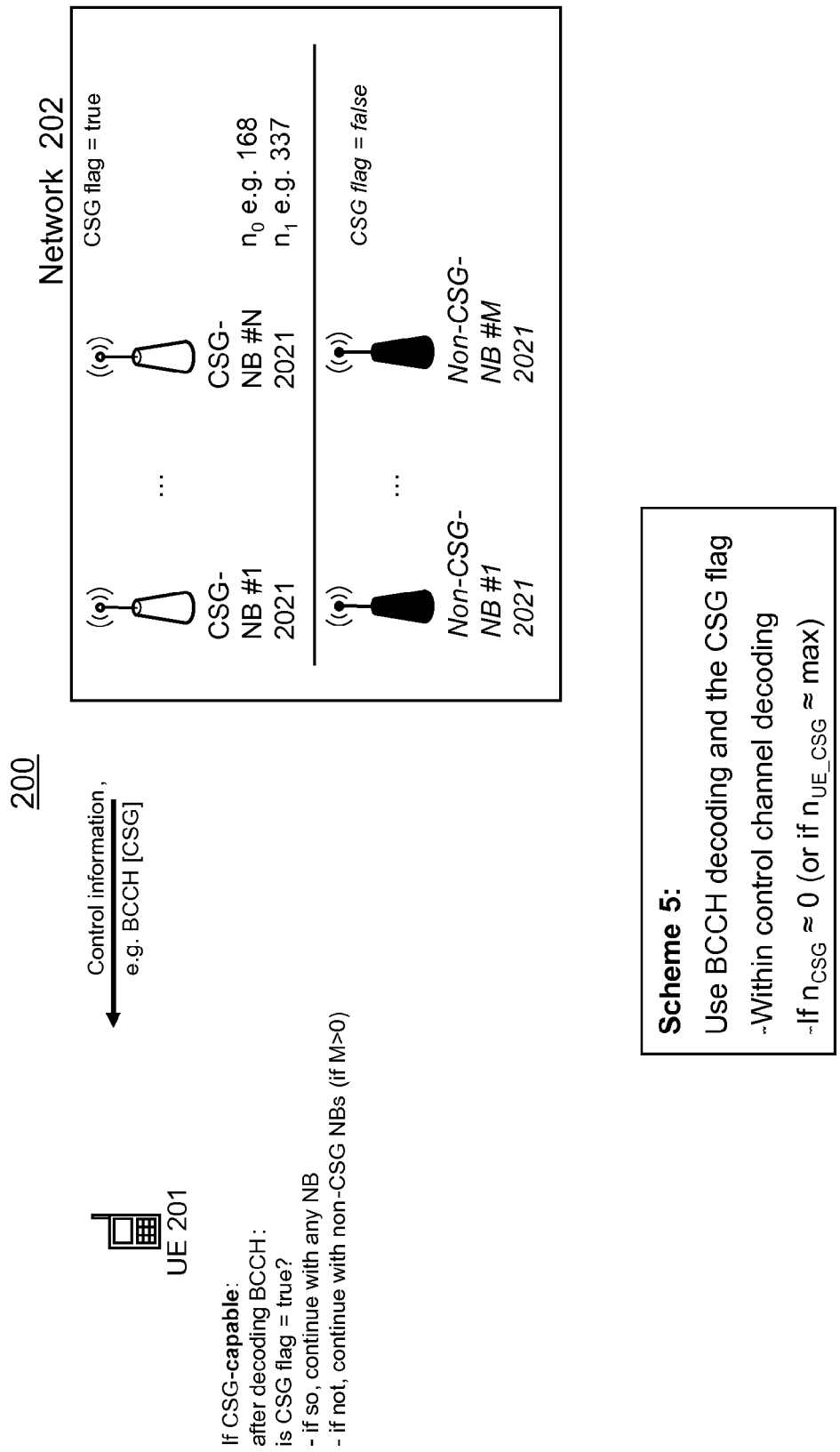

METHODS, APPARATUSES, SYSTEM AND RELATED COMPUTER PROGRAM PRODUCT FOR CELL TYPE DETECTION

FIELD OF THE INVENTION

The present invention relates cell type detection. More specifically, the present invention relates to methods, apparatuses, a system and a related computer program product for cell type detection. Examples of the present invention may be applicable to a communication system with cells that can be of different types, such as the universal mobile telecommunications system (UMTS) terrestrial radio access network (UTRAN), evolved-UTRAN/long term evolution (E-UTRAN/LTE) being standardized in $3^{rd}$ generation partnership project (3GPP) long term evolution.

BACKGROUND

3GPP specifies the $3^{rd}$ generation (3G) LTE as a part e.g. of Release 8 of the 3GPP specifications. A subsequent release of LTE (LTE, e.g. Release 9) and possibly Release 8 may support both closed subscribed group cells (CSG, also known as Home evolved Node Bs (eNBs)) and non-CSG cells (also known as macro cells). Also, user equipments (UEs) (e.g. terminals) may be categorized according to the CSG and non-CSG division, i.e. some terminals may obtain access to both macro cells and CSG cells, while some other terminals do not possess the capability to access CSG cells.

Since some UE procedures (e.g. like mobility or cell identification etc.) may depend on the type of the accessed cell (accessed e.g. via cell selection or cell reselection or handover), and since some UEs may not be capable of accessing a CSG cell, it is applicable that the UEs may distinguish between CSG and non-CSG cells.

Furthermore, it could be avoided that UEs incapable of CSG or UEs which are not registered to any CSG cell, like a H(e)NB, may yield increased power consumption due to the fact that CSG cells are deployed e.g. in the same frequency band where also macro (e)NBs may be operated. This may e.g. be the case if UEs detect that a cell has restricted access very late during idle mode measurement procedures, like cell selection or cell reselection, and also in connected mode during handover.

A worst case scenario may be for example if a UE incapable of CSG travels along a road comprising houses with H(e)NBs on both sides. Then, if there is no early indication that these cells are not relevant for handover or for camping, then the UE's power consumption may increase dramatically compared to the case where the UE detects early that all these cells are home cells where access is not permitted.

There have been approaches addressing the above drawbacks.

One such approach (see e.g. 3GPP radio access network (RAN) working group 2 (WG2)) to distinguish between CSG and non-CSG cells may reside in including a CSG flag (i.e. 1 bit) in the broadcast control channel (BCCH) of each cell, e.g. over downlink shared channel/physical downlink shared channel (DL-SCH/PDSCH).

A possible drawback of the above approaches may reside in that, in order to indentify a cell type, the UE may have to execute the whole cell search (PSS and SSS detection), then demodulate/decode the physical broadcast channel (PBCH) and finally demodulate/decode the BCCH, e.g. if CSG information is coded in BCCH system information and the cell is then found to be inapplicable. If a reserved range of physical layer cell IDs is transmitted in BCCH system information, the UE may have to decode the BCCH at least once.

A further possible drawback may reside in that the above procedure may introduce additional UE power consumption and delay before the cell type is identified even for the UEs incapable of accessing CSG cells. A still further possible drawback may reside in that, by limiting the number of physical cell IDs for macro cells with no access restrictions (non-CSG cells), network planning becomes more difficult for an operator.

A still further possible drawback may reside in that, by limiting the number of physical cell IDs for CSG cells with access restrictions, Configuration of theses cells may become difficult, in particular if a really large number of such cells is set up in a small area.

In consideration of the above, it is an object of examples of the present invention to overcome one or more of the above drawbacks. In particular, the present invention provides methods, apparatuses, a system and a related computer program product for cell type detection.

According to an example of the present invention, in a first aspect, this object is for example achieved by a method comprising:

transmitting signaling information subjected to one of modulation by at least one predefined phase modulation and scrambling by at least one predefined scrambling sequence, the one of the modulation and scrambling being indicative of network cells of a first type and network cells of a second type different from the first type.

According to further refinements of the example of the present invention as defined under the above first aspect, the method further comprises subjecting the signaling information to the one of modulation and scrambling;

the method further comprises modulating the signaling information by the at least one predefined phase modulation;

the method further comprises scrambling the signaling information by the at least one predefined scrambling sequence;

the method further comprises assigning a set of synchronization information to a subset of the network cells, wherein the signaling information is subjected to the one of the modulation and scrambling only for the subset of the network cells;

the method further comprises signaling control information, wherein the transmitting is performed as an auxiliary indication to the signaling.

According to an example of the present invention, in a second aspect, this object is for example achieved by a method comprising:

transmitting one of the following:
i) a primary synchronization signal and a reference signal, the primary synchronization signal and the reference signal having at least one predefined phase relation to each other,
ii) a secondary synchronization signal and a reference signal, the secondary synchronization signal and the reference signal having at least one predefined phase relation to each other, or
iii) a primary synchronization signal and a secondary synchronization signal, the primary synchronization signal and the secondary synchronization signal having at least one predefined phase relation to each other,
the at least one phase relation being indicative of network cells of a first type and network cells of a second type different from the first type.

According to an example of the present invention, in a third aspect, this object is for example achieved by a method comprising:

transmitting indication information indicating network cells of a first type, the network cells being different from network cells of a second type, the transmitting comprising at least one of the following:

a) broadcasting control information, the indication information to be transmitted being an indication flag;

b) assigning a set of synchronization information to the network cells of the first type, and broadcasting control information, the indication information to be transmitted being the synchronization information;

c) reserving at least one signaling code information for the network cells of the first type, the indication information to be transmitted being the signaling code information;

d) transmitting according to the above first aspect; and e) transmitting according to the above second aspect.

According to further refinements of the example of the present invention as defined under the above third aspect, the transmitting of indication information is based on a number of network cell identities for the network cells of the first type, a first number of network cell identities for the network cells of the first type and a second number of network cell identities for the network cells of the first type, the number and the first and second numbers being integers equal to or greater than one, the second number being greater than the first number, wherein the transmitting of item a) is performed if the number is substantially equal to zero, the transmitting of item b) is performed if the number is significantly smaller than the first number, the transmitting of item c) is performed if the number is substantially smaller than the first number or if the number is greater than the first number and smaller than the second number, the transmitting of item d) is performed if the number is greater than the second number, and the transmitting of item e) is performed if the number is greater than the second number;

the transmitting of item a) is also performed if a number of terminals of the first type substantially reaches the number of all available terminals;

the transmitting of item b) is performed for a subset of the network cells, if the number is greater than the first number and smaller than the second number;

the transmitting of item c) is performed if the number is substantially smaller then the second number.

According to further refinements of the example of the present invention as defined under the above first to third aspects, the method further comprises signaling scheme information on a scheme to be used.

According to an example of the present invention, in a fourth aspect, this object is for example achieved by a method comprising:

detecting network cells of a first type and network cells of a second type different from the first type based on received signaling information subjected to one of modulation by at least one predefined phase modulation and scrambling by at least one predefined scrambling sequence, the one of the modulation and scrambling being indicative of the network cells of the first type and the network cells of the second type.

According to further refinements of the example of the present invention as defined under the above fourth aspect, the method further comprises demodulating the signaling information by the at least one predefined phase modulation;

the method further comprises descrambling the signaling information by the at least one predefined scrambling sequence;

the method further comprises receiving the signaling information;

the detecting further comprises testing the received signaling information against a hypothesis;

the method further comprises dereferencing, from a set of synchronization information, a subset of the network cells, wherein the signaling information is subjected to one of demodulation and descrambling only for the subset of the network cells;

the method further comprises receiving signaled control information, wherein the detecting is performed based on the received control information and on the received signaling information as an auxiliary indication.

According to an example of the present invention, in a fifth aspect, this object is for example achieved by a method comprising:

detecting network cells of a first type and network cells of a second type different from the first type based on receiving one of the following:

i) a primary synchronization signal and a reference signal, the primary synchronization signal and the reference signal having at least one predefined phase relation to each other, ii) a secondary synchronization signal and a reference signal, the secondary synchronization signal and the reference signal having at least one predefined phase relation to each other, or iii) a secondary synchronization signal and a primary synchronization signal, the primary synchronization signal and the secondary synchronization signal having at least one predefined phase relation to each other, the at least one phase relation being indicative of network cells of a first type and network cells of a second type different from the first type.

According to an example of the present invention, in a sixth aspect, this object is for example achieved by a method comprising:

detecting network cells of a first type and network cells of a second type different from the first type based on received indication information indicating the network cells of the first type, the detecting comprising at least one of the following:

a) receiving broadcasted control information, and the indication information received being an indication flag;

b) dereferencing, from a set of synchronization information, the network cells of the first type, and receiving broadcasted control information, the indication information received being the synchronization information;

c) reserving at least one signaling code information for the network cells of the first type, the indication information received being the signaling code information;

d) receiving according to the above fourth aspect; and e) receiving according to the above fifth aspect.

According to further refinements of the example of the present invention as defined under the above fourth to sixth aspects, the method further comprises receiving signaled scheme information on a scheme used, wherein the detecting is performed based on the signaled scheme to be used.

According to further refinements of the example of the present invention as defined under the above first to sixth aspects, the signaling information is constituted by a reference signal;

the network cells of the first type are constituted by closed subscriber group network cells;

the network cells of the second type are constituted by one of non-closed subscriber group network cells and macro cells;

the set of synchronization information is constituted by pairs of a primary synchronization signal and a secondary synchronization signal;

the control information is constituted by a one of a broadcast control channel and a primary broadcast channel;

the first number is 168;

the second number is one of 337 and 504;

the indication flag is constituted by a closed subscriber group flag;

the signaling code information is constituted by a primary synchronization signal code.

According to an example of the present invention, in a seventh aspect, this object is for example achieved by an apparatus comprising:

means for transmitting signaling information subjected to one of modulation by at least one predefined phase modulation and scrambling by at least one predefined scrambling sequence, the one of the modulation and scrambling being indicative of network cells of a first type and network cells of a second type different from the first type.

According to further refinements of the example of the present invention as defined under the above seventh aspect, the apparatus further comprises means for subjecting the signaling information to the one of modulation and scrambling;

the apparatus further comprises means for modulating the signaling information by the at least one predefined phase modulation;

the apparatus further comprises means for scrambling the signaling information by the at least one predefined scrambling sequence;

the apparatus further comprises means for assigning a set of synchronization information to a subset of the network cells, wherein the means for subjecting is configured to subject the signaling information to the one of the modulation and scrambling only for the subset of the network cells;

the apparatus further comprises means for signaling control information, wherein the means for transmitting is configured to transmit as an auxiliary indication to the signaling performed by the means for signaling.

According to an example of the present invention, in an eighth aspect, this object is for example achieved by an apparatus comprising:

means for transmitting one of the following:
i) a primary synchronization signal and a reference signal, the primary synchronization signal and the reference signal having at least one predefined phase relation to each other,
ii) a secondary synchronization signal and a reference signal, the secondary synchronization signal and the reference signal having at least one predefined phase relation to each other, or
iii) a primary synchronization signal and a secondary synchronization signal, the primary synchronization signal and the secondary synchronization signal having at least one predefined phase relation to each other, the at least one phase relation being indicative of network cells of a first type and network cells of a second type different from the first type.

According to an example of the present invention, in a ninth aspect, this object is for example achieved by an apparatus comprising:

means for transmitting indication information indicating network cells of a first type, the network cells being different from network cells of a second type, the means for transmitting further comprising at least one of the following:

a) means for broadcasting control information, the indication information to be transmitted being an indication flag;

b) means for assigning a set of synchronization information to the network cells of the first type, and means for broadcasting control information, the indication information to be transmitted being the synchronization information;

c) means for reserving at least one signaling code information for the network cells of the first type, the indication information to be transmitted being the signaling code information;

d) means for transmitting according to the above seventh aspect; and e) means for transmitting according to the above eighth aspect.

According to further refinements of the example of the present invention as defined under the above ninth aspect, the means for transmitting of indication information is configured to transmit based on a number of network cell identities for the network cells of the first type, a first number of network cell identities for the network cells of the first type and a second number of network cell identities for the network cells of the first type, the number and the first and second numbers being integers equal to or greater than one, the second number being greater than the first number, wherein the means for transmitting comprises at least one of the following the means of item a) if the number is substantially equal to zero, the means of item b) if the number is significantly smaller than the first number, the means of item c) if the number is substantially smaller than the first number or if the number is greater than the first number and smaller than the second number, the means of item d) if the number is greater than the second number, and the means of item e) if the number is greater than the second number;

the means for transmitting of item a) is configured to transmit also if a number of terminals of the first type substantially reaches the number of all available terminals;

the means for transmitting of item b) is configured to transmit for a subset of the network cells, if the number is greater than the first number and smaller than the second number;

the means for transmitting of item c) is configured to transmit if the number is substantially smaller then the second number.

According to further refinements of the example of the present invention as defined under the above seventh to ninth aspects, the apparatus further comprises means for signaling scheme information on a scheme to be used.

According to an example of the present invention, in a tenth aspect, this object is for example achieved by an apparatus comprising:

means for detecting network cells of a first type and network cells of a second type different from the first type based on received signaling information subjected to one of modulation by at least one predefined phase modulation and scrambling by at least one predefined scrambling sequence, the one of the modulation and scrambling being indicative of the network cells of the first type and the network cells of the second type.

According to further refinements of the example of the present invention as defined under the above seventh to tenth aspect, the apparatus further comprises means for demodulating the signaling information by the at least one predefined phase modulation;

the apparatus further comprises means for descrambling the signaling information by the at least one predefined scrambling sequence;

the apparatus further comprises means for receiving the signaling information;

the means for detecting further comprises means for testing the received signaling information against a hypothesis;

the apparatus further comprises means for dereferencing, from a set of synchronization information, a subset of the network cells, wherein the one of the means for demodulating and the means for descrambling the signaling information is configured to demodulate or descramble only for the subset of the network cells;

the apparatus further comprises means for receiving signaled control information, wherein the means for detecting is configured to detect based on the control information received by the second means for receiving and on the signaling information received by the means for receiving as an auxiliary indication.

According to an example of the present invention, in an eleventh aspect, this object is for example achieved by an apparatus comprising:

means for detecting network cells of a first type and network cells of a second type different from the first type based on receiving, by means for receiving, one of the following:
 i) a primary synchronization signal and a reference signal, the primary synchronization signal and the reference signal having at least one predefined phase relation to each other,
 ii) a secondary synchronization signal and a reference signal, the secondary synchronization signal and the reference signal having at least one predefined phase relation to each other, or
 iii) a primary synchronization signal and a secondary synchronization signal, the primary synchronization signal and the secondary synchronization signal having at least one predefined phase relation to each other, the at least one phase relation being indicative of the network cells of the first type and the network cells of the second type.

According to an example of the present invention, in a twelfth aspect, this object is for example achieved by an apparatus comprising:

means for detecting network cells of a first type and network cells of a second type different from the first type based on received indication information indicating the network cells of the first type, the means for detecting comprising at least one of the following:
 a) the indication information received being an indication flag;
 b) means for dereferencing, from a set of synchronization information, the network cells of the first type, and means for receiving broadcasted control information (BCCH), the indication information received being the synchronization information;
 c) means for reserving at least one signaling code information for the network cells of the first type, the indication information received being the signaling code information;
 d) means for receiving according to the above tenth aspect; and e) means for receiving according to the above eleventh aspect.

According to further refinements of the example of the present invention as defined under the above seventh to twelfth aspects, the signaling information is constituted by a reference signal;

the network cells of the first type are constituted by closed subscriber group network cells;

the network cells of the second type are constituted by one of non-closed subscriber group network cells and macro cells;

the set of synchronization information is constituted by pairs of a primary synchronization signal and a secondary synchronization signal;

the control information is constituted by a one of a broadcast control channel and a primary broadcast channel;

the first number is 168;

the second number is one of 337 and 504;

the indication flag is constituted by a closed subscriber group flag;

the signaling code information is constituted by a primary synchronization signal code;

at least one, or more of means for transmitting, means for subjecting, means for modulating, means for scrambling, means for assigning, means for signaling, means for detecting, means for demodulating, means for descrambling, means for dereferencing, means for receiving, means for testing and the apparatus is implemented as a chipset or module.

According to further refinements of the example of the present invention as defined under the above seventh to ninth aspects, the apparatus is constituted by a one of a home evolved node B and a macro cell node B.

According to further refinements of the example of the present invention as defined under the above tenth to twelfth aspects, the apparatus further comprises means for receiving signaled scheme information on a scheme used, wherein the means for detecting is configured to detect based on the signaled scheme to be used;

the apparatus is constituted by a user equipment.

According to an example of the present invention, in a thirteenth aspect, this object is for example achieved by a system comprising:

at least one home evolved node B according to the above seventh to ninth aspects; and a user equipment according to the above tenth to twelfth aspects.

According to an example of the present invention, in a fourteenth aspect, this object is for example achieved by a computer program product comprising code means for performing method steps of a method according to the above first to sixth aspects, when run on a processing means or module.

In this connection, it has to be pointed out that examples of the present invention enable one or more of the following:

Providing an efficient and flexible method/apparatus for distinguishing between CSG cells and macro cells;

Enabling conveyance over wide area cells e.g. via the BCCH;

Early indication of CSG, e.g. if an operator deploys CSG nodes in the same carrier frequency as the macro deployment (which is open for all subscribers/UEs);

Eliminating the need to restrict the number of applicable physical cell IDs for non-CSG cells;

Eliminating the need to restrict the number of applicable physical cell IDs for CSG cells;

for the UE, eliminating the necessity for hardware changes and alleviating the necessity for big software changes;

Enabling CSG detection early during the cell search and neighbor cell measurement phase with minimal complexity;

Providing flexibility for an operator with respect to the number of deployed CSG cells. In case the number of CSG cells is large, a cell type may be detected already in first cell search step (e.g. scheme 1 described herein below), thus minimizing the negative impact of CSG cells to non-CSG UEs. Contrary, if the number of CSG cells is quite low, there is no need to reserve SSS and/or PSS codes, thus simplifying network planning for the operator.

For the network/(e)NB(s), eliminating reduction of the number of cell IDs for macro cells (and thus allowing also the same maximum number of cell IDs for CSG cells).

Eliminating additional UE power consumption and delay before the cell type is identified e.g. for the UEs incapable of accessing CSG cells.

BRIEF DESCRIPTION OF THE DRAWINGS

Examples of the present invention are described herein below with reference to the accompanying drawings, in which:

FIG. 4 shows a fourth scheme (scheme 4) for cell type detection according to a second example of the present invention;

FIG. 5 shows a fifth scheme (scheme 5) for cell type detection;

DETAILED DESCRIPTION OF THE PRESENT INVENTION

Examples of the present invention are described herein below by way of example with reference to the accompanying drawings.

It is to be noted that for this description, the terms "reference signal; closed subscriber group network cells; non-closed subscriber group network cells or macro cells; pairs of a primary synchronization signal and a secondary synchronization signal; broadcast control channel or a primary broadcast channel; 168; 337 or 504; closed subscriber group flag; and primary synchronization signal code" are examples for "signaling information; network cells of the first type; network cells of the second type; set of synchronization information; control information; first number; second number; indication flag; and signaling code information", respectively, without restricting the latter-named terms to the special technical or implementation details imposed to the first-named terms.

According to examples of the present invention, further approaches for distinguishing cell types (e.g. CSG versus non CSG cells) may reside in the following:

Reserving or adding one PSS (primary synchronization signal) code, so that there is a one-to-one mapping between the used PSS code(s) and cell/carrier types. This approach is applicable e.g. for distinguishing between dedicated multimedia broadcast/multicast service (MBMS) single frequency network (MBSFN) cells/carriers and unicast/mixed cells/carriers.

Applying different relative time distances between PSS and SSS for different types of cells/carriers. This approach is currently being applicable e.g. for differentiation between frequency division duplex (FDD) and time division duplex (TDD) carriers/cells.

Reserving some (most suitably consecutive) range of physical layer cell IDs (or add new cell IDs) for one cell type and use the remaining cell IDs for the other cell type. The range of cell IDs reserved for CSG cells may be configurable and signaled e.g. via the BCCH.

Figure 1:
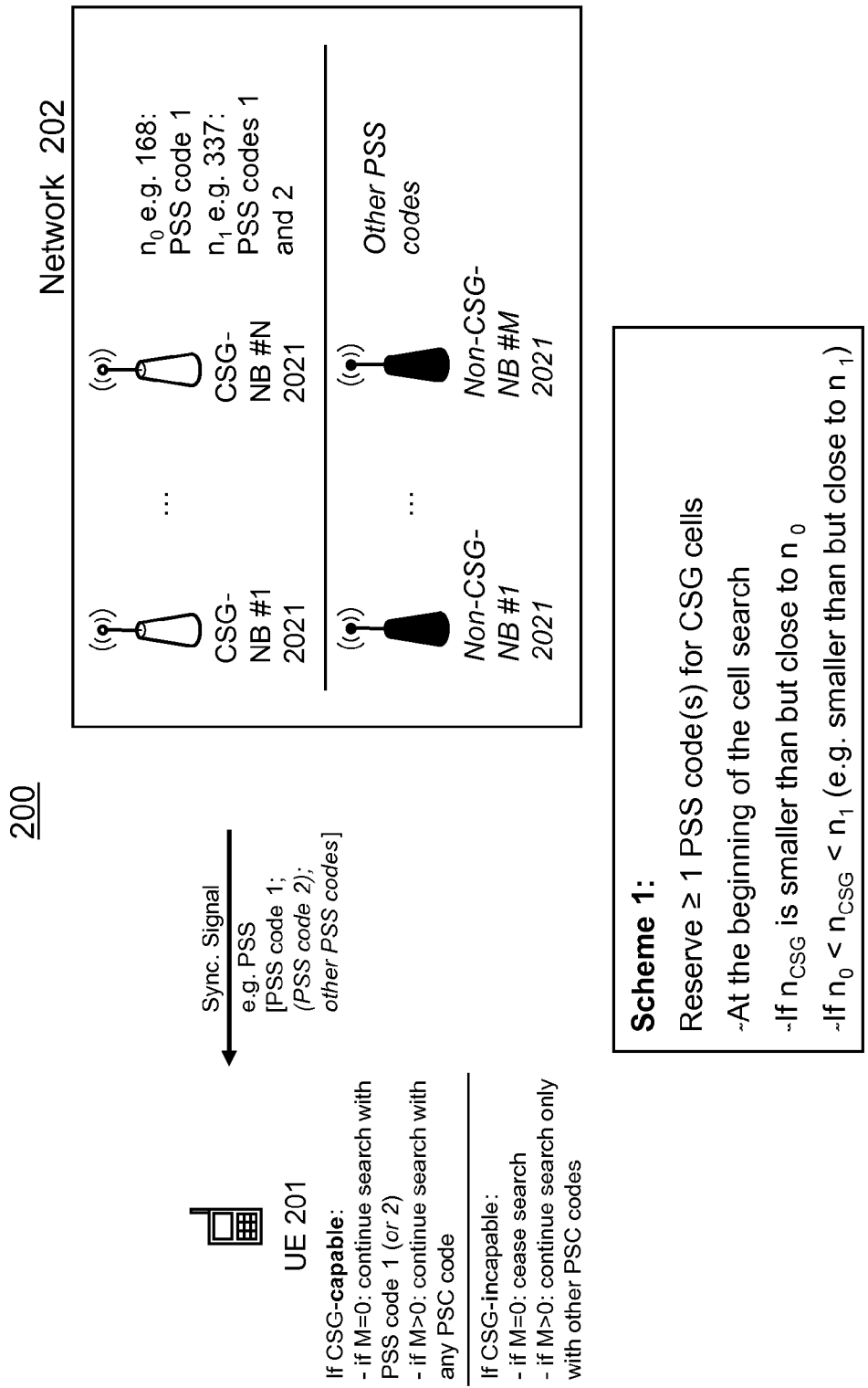
FIG. 1 shows a first scheme (scheme 1) for cell type detection according to an example of the present invention.

FIG. 1 shows the first scheme (scheme 1) for cell type detection according to an example of the present invention. As shown in FIG. 1, a communication network 200 may comprise a UE 201 and a network 202. The network 202 may in turn comprise up to N (N being an integer equal to or greater than one) CSG node Bs (NB) 2021 and up to M (M being an integer equal to or greater than zero) non-CSG NBs 2021.

As shown in FIG. 1, scheme 1 may reside in reserving one (or two) PSS code(s) 1 (and 2) for CSG cells. The PSS code(s) may be transmitted from the network 202 or any one of the NBs 2021 to the UE 201 e.g. in a synchronization signal. With scheme 1, the CSG NBs 2021 may be identified in the first stage of a cell search. Thus, in case the UE 1 is incapable of CSG, such a UE may avoid searching for that PSS code(s) or that set of PSS code(s) altogether.

Scheme 1 may be applicable in cases where there is a need for a large number of CSG cells, and the number of Cell IDs needed to identify CSG cells is close to $n_0$ (e.g. 168) (i.e. reserved PSS code 1 for CSG) or greater than $n_0$ (e.g. 168) and less than or close to $n_1$ (e.g. 337) (i.e. reserved PSS codes 1 and 2 for CSG). It is to be noted that the number of CSG cells may be greater than the number(s) of cell IDs (e.g. $n_0$ or $n_1$). Furthermore, cell IDs may be recycled after some distance, but within the vicinity of one cell, the cell IDs may be unique. In case there are more cell IDs available, the planning of the assignment of those cell IDs may be simpler. In the extreme case a random assignment may yield a usable assignment (as the possibility that two neighboring cells are assigned the same cell ID accidentally is small). The fewer cell IDs are available, the more thoroughly those cell IDs may have to be assigned.

Scheme 1 may also be applicable, if there is no need for a large number of cell IDs for non-CSG cells, e.g. because these cells are rigorously planned and therefore it is possible to reuse cell IDs more often and consequently less cell IDs are required.

Furthermore, the PSS codes that are used may have a property that can be exploited when assigning PSS codes for CSG cells. This is the case for the CSG codes that are now being used for the LTE system. These codes are specified e.g. in 3GPP TS 36.211, titled "Evolved Universal Terrestrial Radio Access (E-UTRA); Physical channels and modulation", V 8.3.0, chapter 6.11.1.1: "Sequence generation" states that a sequence d(n) used for the primary synchronization signal may be generated from a frequency-domain so-called Zadoff-Chu sequence according to the following equation $$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases}$$

where the Zadoff-Chu root sequence index u is given by the following table 1 (corresponding to table 6.11.1.1-1 in TS 36.211):

TABLE 1

Root indices for the primary synchronization signal.

| $N_{ID}^{(2)}$ | Root index $u$ |
|---|---|
| 0 | 25 |
| 1 | 29 |
| 2 | 34 |

The sequences specified are so-called Zadoff-Chu sequences. Two of these sequences may have a particular property called complex conjugate symmetry property so that those two sequences may be detected e.g. with one correlator, which makes the detection rather efficient. For the third sequence, another correlator may be used. If this third PSS is reserved for the first type (e.g. for CSG), UEs of the second type (e.g. non-CSG) may avoid searching for that third PSS and may not need to use that second correlator which would alleviate complexity and cause less power consumption, and consequently less battery drain, when compared to the case when a UE has to detect all 3 PSS codes.

Two Zadoff-Chu sequences are complex conjugate symmetric, if their Zadoff-Chu root sequence indices sum up to the length of the Zadoff-Chu sequence, which may e.g. be 63 in this case. The Zadoff-Chu root sequence indices of the last two PSS sequences may e.g. be 29 and 34, respectively, and 29+34=63. Thus, the two sequences are complex conjugate symmetric and a correlator may be used that correlates for both sequences efficiently. This is due to the fact that the elements of two complex conjugate symmetric Zadoff-Chu sequences are element wise complex conjugate and therefore, the correlation of both sequences may be performed efficiently. The first sequence may not be complex conjugate symmetric to any of the other sequences, so a dedicated correlator may have to be used for it.

According to one further aspect of scheme 1 according to an example of the present invention, the above first Zadoff-Chu PSS sequences may be reserved, i.e. the one with Zadoff-Chu root sequence index u=25 for the first type (e.g. for CSG).

According to another option of scheme 1, an additional PSS may be reserved for CSG cells. In this way, no IDs are lost for second type (e.g. non CSG) cells, i.e. ID planning is not complicated for second type (e.g. non CSG) cells. In this case, for this additional PSS, the Zadoff-Chu sequence with Zadoff-Chu root sequence index u=38 may be used because 25+38=63, i.e. the additional PSS is complex conjugate symmetric to the first PSS and may therefore be efficiently correlated. In this way, the introduction of an additional PSS may be performed without significant increase in the correlation complexity when searching for all these possible PSSs.

Figure 2:
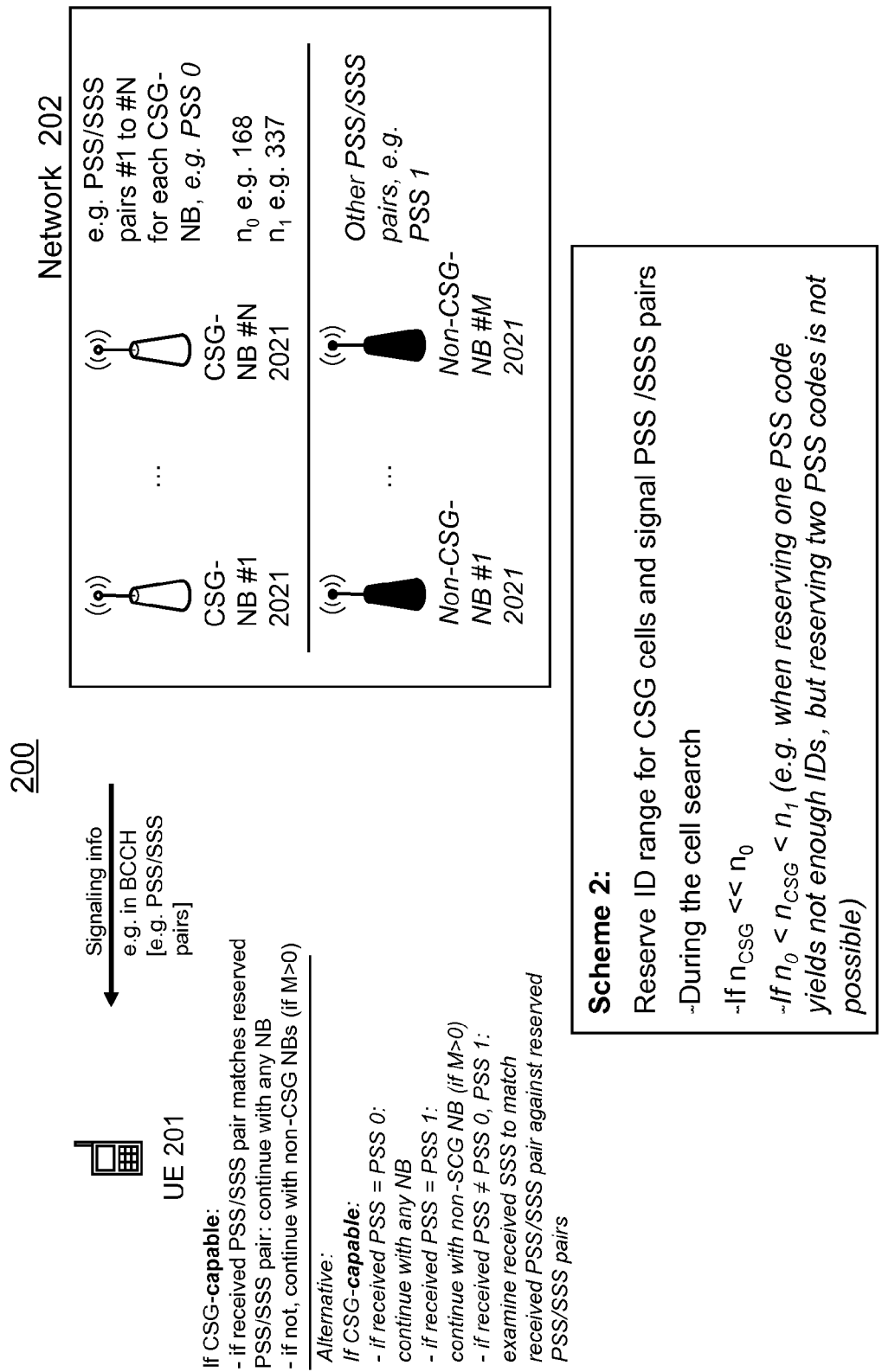
FIG. 2 shows a second scheme (scheme 2) for cell type detection.

FIG. 2 shows the second scheme (scheme 2) for cell type detection. Reference signs in FIG. 2 identical to those in FIG. 1 designate the same or similar means or entities, and a description of those means or entities is omitted.

As shown in FIG. 2, scheme 2 may reside in reserving a certain (e.g. consecutive or non-consecutive) range of cell IDs for CSG, and in signaling the reserved range from the network 202 or any one of the NBs 2021 to the UE 201 e.g. in a broadcast channel (e.g. via the BCCH). According to scheme 2, a cell type may be identified e.g. via a PSS and SSS pair and thus, a full cell search may be required. However, this full cell search may be required only once e.g. for the cell the UE does camp on initially, and for that purpose anyhow a full cell search may be required. For subsequent cell searches, the reserved range may be already known to the UE, thus at least some UEs may avoid searching e.g. for CSG cells.

Scheme 2 may be applicable in cases where the number of CSG cells and the required number of CSG cell IDs is relatively small, i.e. $\ll n_0$ (e.g. 168). Then, it may not to be necessary to fully reserve one PSS code (since this may yield too many IDs or unnecessarily few IDs remaining for other purposes).

Scheme 2 may also be applicable in a case where the number of CSG cell IDs needs to be larger than $n_0$ (e.g. 168) but less than $n_1$ (e.g. 337), since the remaining IDs may be required for other purposes, i.e. it may be neither possible to reserve only one PSS code (since this may yield too few IDs) nor to fully reserve two PSS codes (since this may yield too many IDs or too few IDs remaining for other purposes).

In this case, scheme 2 may be adapted to determine the network cell type (CSG or non-CSG) for two of the three PSS codes (e.g. PSS 0 indicates CSG, PSS 1 indicates non-CSG). Thus, only for the third PSS code, also the SSS may need to be investigated, such that scheme 3 may need to perform detection of the SSS only in a subset of the IDs. Scheme 2 may be applicable during a deployment, i.e. the "unique" PSS may be prioritized (e.g. used more often) when assigning PSS and SSS to network cells during cell configuration.

Figure 3:
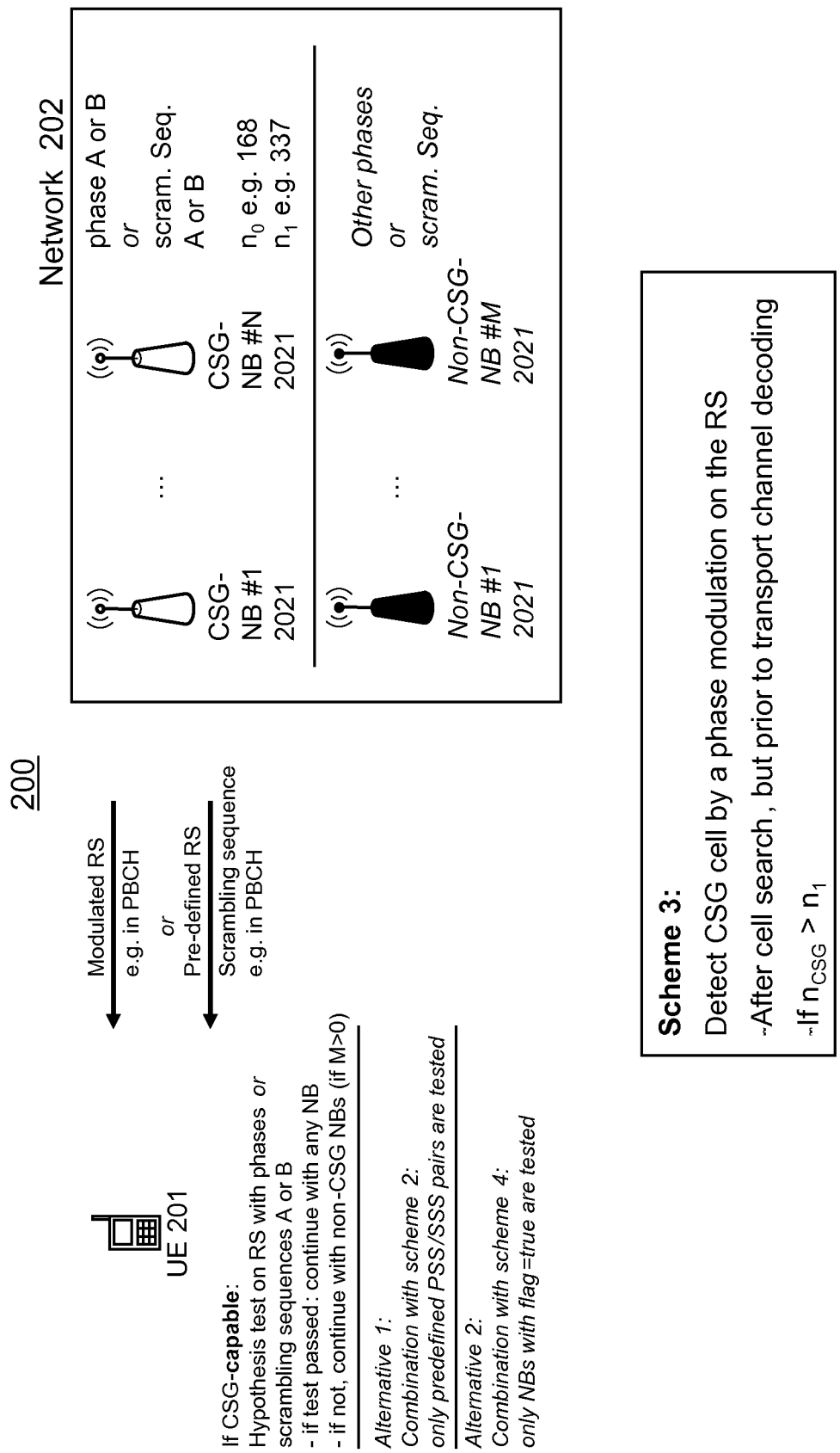
FIG. 3 shows a third scheme (scheme 3) for cell type detection according to a first example of the present invention.

FIG. 3 shows the third scheme (scheme 3) for cell type detection according to the first example of the present invention. Reference signs in FIG. 3 identical to those in FIG. 1 designate the same or similar means or entities, and a description of those means or entities is omitted.

Scheme 3 may reside in detecting a NB 2021 of the $1^{st}$ type (e.g. a CSG cell) via a phase modulation on signaling information (e.g. RS) (e.g. relative to the PSS/SSS/data phase) or via a different scrambling sequence for the signaling information (e.g. RS).

According to scheme 3, a NB 2021 of the $1^{st}$ type (e.g. CSG cell) may be detected after cell search but prior to any transport channel decoding e.g. via hypotheses testing on the signaling information (e.g. RS) (e.g. phase A or B, RS scrambling sequence A or B) or e.g. in the process of PBCH decoding (PBCH decoding may fail with a wrong hypothesis on the RS phase/RS scrambling sequence). The detection via different RS scrambling sequences may be implemented e.g. either by adding a CSG flag (1 bit) to the current set of RS sequence generator initialization bits or by extending the range of the current cell ID initialization bits and dividing tem into two non-overlapping ranges of cell IDs for CSG and non-CSG cells.

Scheme 3 may be applicable if e.g. $n_1$=504 additional cell IDs (which may be a maximum number of available cells) can be provided for CSG without additional or reserved synchronization information (e.g. PSS/SSS codes). Scheme 3 may also be applicable when the required number of cell IDs for CSG is greater than $n_1$ (e.g. 336).

As a first alternative in scheme 3, only a certain range of synchronization information (e.g. PSS/SSS pairs) may be used for CSG, in which case the blind detection on the signaling information (e.g. RS) may be executed only for these specific PSS/SSS pairs to check whether the cell in question is a CSG cell or macro cell, while all other synchronization information (e.g. PSS/SSS pairs) may indicate a macro cell.

As a second alternative in scheme 3, scheme 3 as described above may be used as an auxiliary indication of the $1^{st}$ type (e.g. CSG) in addition to the signaling on the BCCH.

Finally, scheme 3 may be applicable to two different sets of signaling information (e.g. RS) scrambling sequences (e.g. 504 RS sequences for CSG and another 504 RS sequences for non-CSG), wherein UEs 201 incapable of CSG may dispense with the blind detection, if e.g. a CSG cell NB 2021 is measured, but the UE 201 assumes the NB 2021 in question is a macro cell, then the UE may not detect any energy in the reference signal received power/quality (RSRP/RSRQ) measurements (e.g. due to a wrongly assumed RS sequence), may stop measurements and may not select/reselect/handover (to) the cell in question. Furthermore, scheme 3 may be used as a way of verification of the CSG non-CSG detection, e.g. if another scheme (e.g. scheme 1 or 2) is used e.g. as a primary method of CSG detection in order to increase robustness of the detection.

FIG. 4 shows the fourth scheme (scheme 4) for cell type detection according to the second example of the present invention. Reference signs in FIG. 4 identical to those in FIG. 1 designate the same or similar means or entities, and a description of those means or entities is omitted.

Scheme 4 may reside in using a predefined phase relation between PSS relative to RS and/or SSS relative to RS or a predefined phase relation between PSS and SSS to indicate the $1^{st}$ type (e.g. CSG).

Scheme 4 may also be applicable with legacy eNBs which may accidentally use a specific phase relation. To this end, the predefined phase relation(s) may be advertised e.g. on the BCCH, i.e. whether the phase relation in question can be used for early CSG detection. Scheme 4 may also be applicable to legacy UEs (e.g. Release 8 UEs) which may not be designed to operate e.g. with CSG, and which may additionally assume a specific phase relation for detection. In this case, the specific phase relation(s) that these legacy UEs assume may be used to indicate ordinary (e.g. non CSG) cells, while CSG cells use another phase relation. It may occur that the legacy UEs are unable to detect the cell if another phase relation is used, but this may not affect the legacy UE, since the legacy UE may be incapable of operating e.g. in a CSG cell. UEs that implement the phase detection can use the phase relation for early CSG detection.

Similar to scheme 3, scheme 4 may be applicable if e.g. $n_1$=504 additional cell IDs (which may be a maximum number of available cells) can be provided for CSG without additional or reserved synchronization information (e.g. PSS/SSS codes). Scheme 3 may also be applicable when the required number of cell IDs for CSG is greater than $n_1$ (e.g. 336).

FIG. 5 shows the fifth scheme (scheme 5) for cell type detection. Reference signs in FIG. 5 identical to those in FIG. 1 designate the same or similar means or entities, and a description of those means or entities is omitted.

Scheme 5 may reside in using e.g. the BCCH decoding and the CSG flag to detect the cell type.

Scheme 5 may be applicable when nearly none (or none) of the cells/NBs 2021 are of the $1^{st}$ type (e.g. CSG) or most of UEs (or all UEs) are of the $1^{st}$ type (e.g. CSG). Usage of scheme 5 may, similarly to schemes 1 to 4 above, be signaled e.g. on the BCCH and may be applicable for selection of configuration by an operator, e.g. if no CSG cells are deployed on the same carrier by the operator in question. Then there is also no restriction on allocation of cell IDs or PSS or SSS to the cells, i.e. planning may be eased. Scheme 5 may be also used as a way of verification, e.g. if some of the previous schemes may be used as a primary detection scheme.

Figure 6:
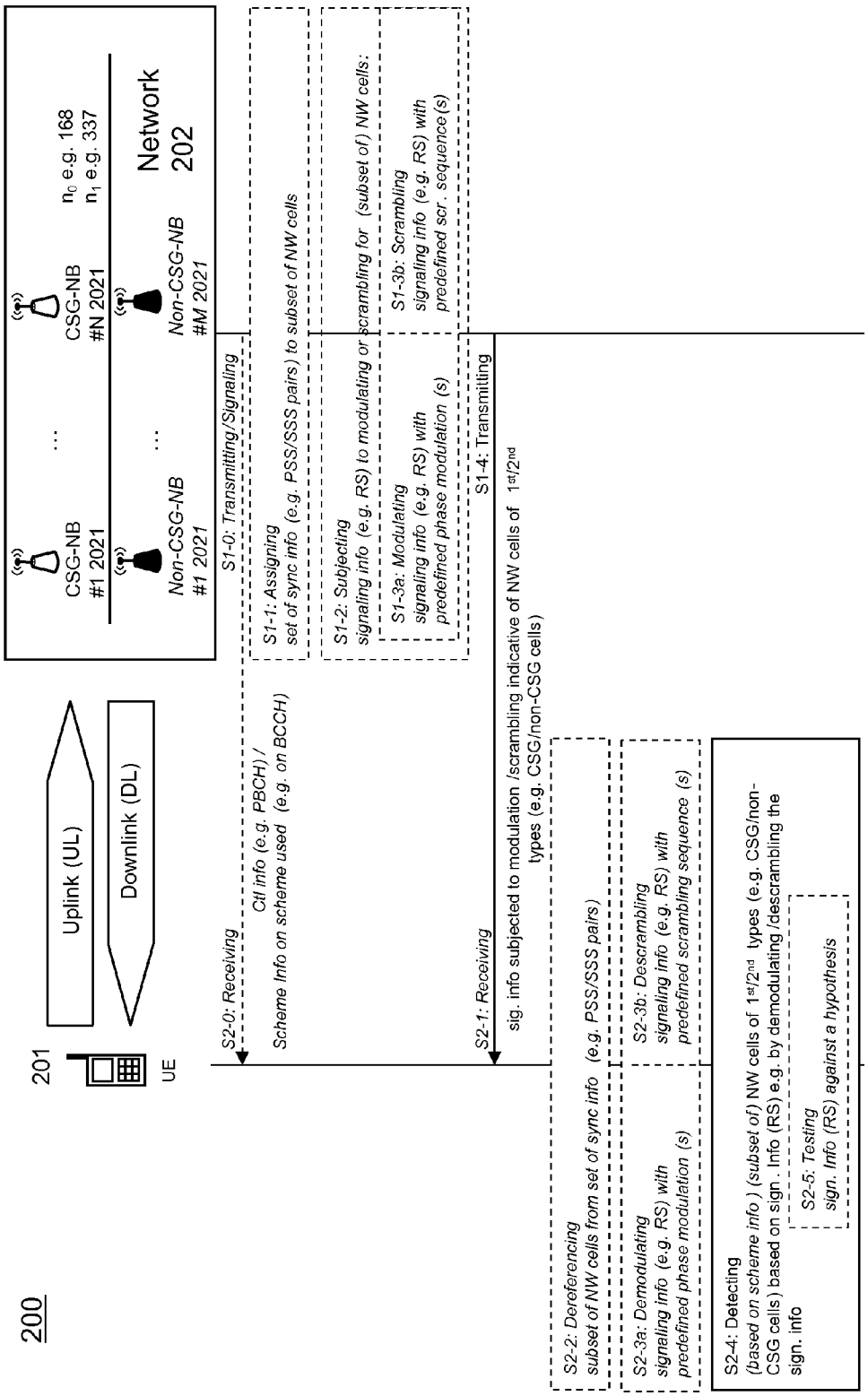
FIG. 6 shows methods for cell type detection according to the first example of the present invention deploying the third scheme.

FIG. 6 shows methods for cell type detection according to the first example of the present invention deploying the third scheme. Signaling between elements is indicated in horizontal direction, while time aspects between signaling may be reflected in the vertical arrangement of the signaling sequence as well as in the sequence numbers. It is to be noted that the time aspects indicated in FIG. 6 do not necessarily restrict any one of the method steps shown to the step sequence outlined. This applies in particular to method steps that are functionally disjunctive with each other: for example, optional step S1-0 (transmitting of control information) is shown to take place before step S1-4 (transmitting of signaling information); however, steps S1-0 and S1-4 may also be performed in another order including concurrently. Within FIG. 6, for ease of description, means or portions which may provide main functionalities are depicted with solid functional blocks or arrows and/or a normal font, while means or portions which may provide optional functions are depicted with dashed functional blocks or arrows and/or an italic font.

As shown in FIG. 6 (and described in conjunction with FIG. 1 herein above), the communication system 200 may comprise the UE 201 and the network 202 which in turn may comprise N NBs 2021 of the $1^{st}$ type (e.g. CSG) and M NBs 2021 of the $2^{nd}$ type (e.g. non-CSG). It is to be noted that herein below, any references to one of the NBs 2021 may designate one or more of the (CSG/non-CSG) H(e)NBs 2021, or may also designate a network controller (not shown) for managing the NBs 2021. Furthermore, it is to be noted that herein below, one UE 201 is shown for descriptive purposes; however, this does not exclude that more than one UE 201 may perform the same cell type detection (to be described herein below).

As optional preparatory measures, in an optional step S1-0, e.g. the NB 2021 may perform signaling control information (e.g. on the PBCH or BCCH), wherein a transmitting of signaling information (described herein below) may be performed as an auxiliary indication to the signaling. Alternatively or in addition, in the optional step S1-0, e.g. the NB 2021 may perform signaling scheme information on the scheme used (e.g. on the BCCH). In an optional step S2-0, e.g. the UE 201 may perform receiving the signaled control information (e.g. on the PBCH or BCCH) and/or the signaled scheme information (e.g. on the BCCH), wherein a detecting of a network cell type (to be described herein below) may be performed based on the received control information and on the received signaling information as an auxiliary indication (and/or e.g. based on the signaled scheme to be used).

In an optional step S1-1, e.g. the NB 2021 or a controlling entity may perform assigning a set of synchronization information (e.g. PSS/SSS pairs) to a subset of the network cells, wherein the signaling information may be subjected to one of modulation and scrambling only for the subset of the network cells.

In an optional step S1-2, e.g. the NB 2021 may perform subjecting the signaling information (e.g. RS) to the one of modulation and scrambling. Accordingly, in an optional step S1-3a, e.g. the NB 2021 may perform modulating the signaling information (e.g. RS) by at least one predefined phase modulation, or in an optional step S1-3b, e.g. the NB 2021 may perform scrambling the signaling information (e.g. RS) by at least one predefined scrambling sequence.

Then, in step S1-4, e.g. the NB 2021 may perform transmitting the signaling information (e.g. RS) subjected to the one of modulation by the at least one predefined phase modulation and scrambling by the at least one predefined scrambling sequence, the one of the modulation and scrambling being indicative of network cells (e.g. CSG cells) of a first type and network cells (e.g. non-CSG cells) of a second type different from the first type. In an optional step S2-1, e.g. the UE 201 may perform receiving the signaling information transmitted.

Then, in an optional step S2-2, e.g. the UE 201 may perform dereferencing, from a set of synchronization information (e.g. PSS/SSS pairs), a subset of the network cells, wherein the signaling information is subjected to the one of demodulation and descrambling only for the subset of the network cells.

Then, in an optional step S2-3a, e.g. the UE 201 may perform demodulating the signaling information (e.g. RS) by the at least one predefined phase modulation. Alternatively, in an optional step S2-3b, e.g. the UE 201 may perform descrambling (S2-3b) the signaling information by the at least one predefined scrambling sequence.

Then, in step S2-4, e.g. the UE 201 may perform detecting the network cells (e.g. CSG cells) of the first type and the network cells (e.g. non-CSG cells) of the second type based on the received signaling information (e.g. RS) subjected to the one of modulation by the at least one predefined phase modulation and scrambling by the at least one predefined scrambling sequence, the one of the modulation and scrambling being indicative of the network cells of the first type and the network cells of the second type.

In an optional step S2-5, e.g. the UE 201 may perform testing the received signaling information against a hypothesis, e.g. for augmenting the detecting performed in step S1-4.

Figure 7:
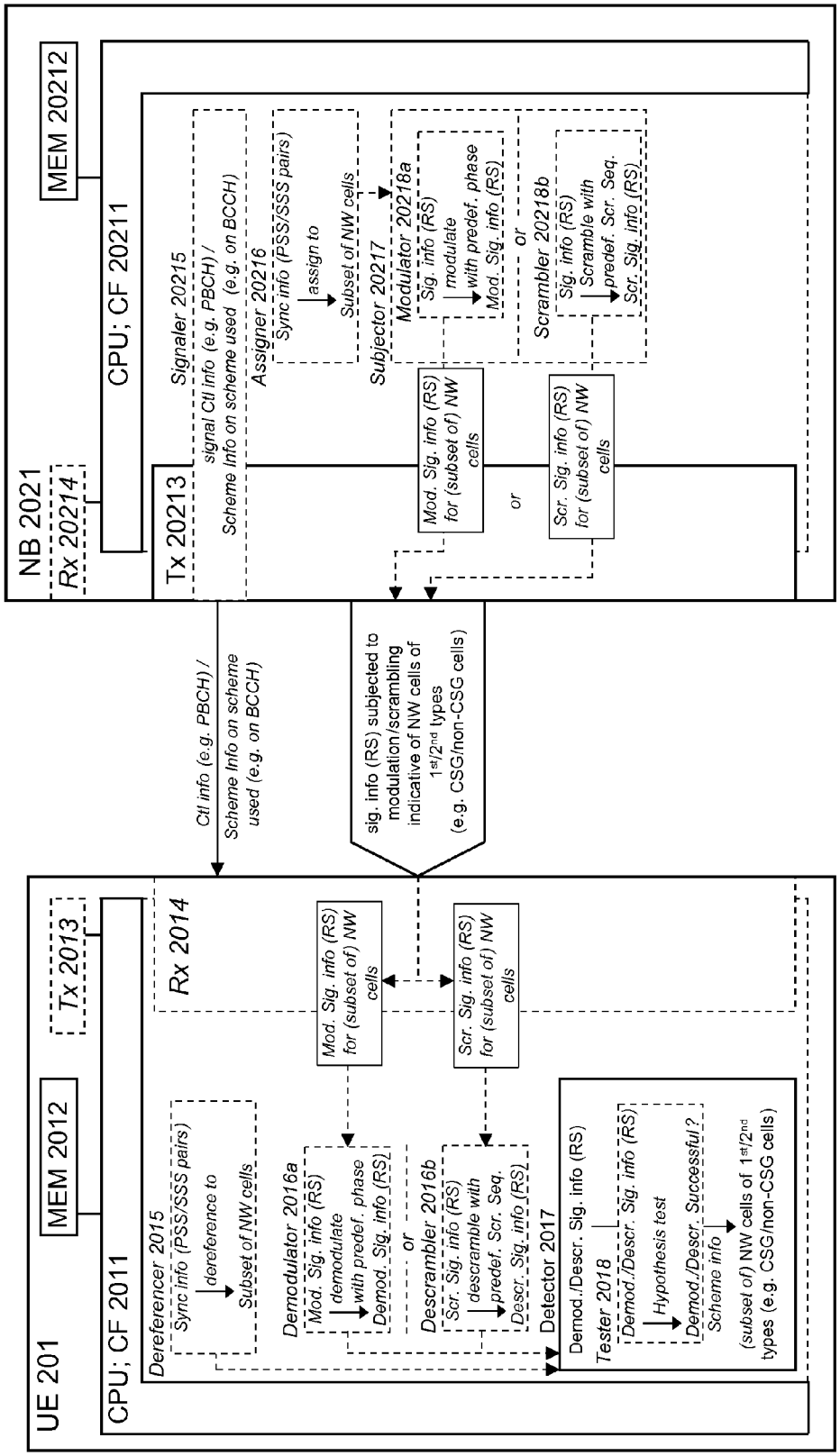
FIG. 7 shows apparatuses (e.g. UE 201 and eNB 2021) for cell type detection according to the first example of the present invention deploying the third scheme.

FIG. 7 shows apparatuses (e.g. UE 201 and eNB 2021) for cell type detection according to the first example of the present invention deploying the third scheme. Within FIG. 7, for ease of description, means or portions which may provide main functionalities are depicted with solid functional blocks or arrows and a normal font, while means or portions which may provide optional functions are depicted with dashed functional blocks or arrows and an italic font.

The NB 2021 may comprise a CPU (or core functionality CF) 20211, a memory 20212, a transmitter (or means for transmitting) 20213, an optional receiver (or means for receiving) 20214, an optional signaler (or means for signaling) 20215, an optional assigner (or means for assigning) 20216, an optional subjector (or means for subjecting) 20217, an optional modulator (or means for modulating) 20218a and an optional scrambler (or means for scrambling) 20218b.

The UE 201 may comprise a CPU (or core functionality CF) 2011, a memory 2012, an optional transmitter (or means for transmitting) 2013, an optional receiver (or means for receiving) 2014, an optional dereferencer (or means for dereferencing) 2015, an optional demodulator (or means for demodulating) 2016a, an optional descrambler (or means for descrambling) 2016b, a detector (or means for detecting) 2017 and an optional tester (or means for testing) 2018.

As indicated by the dashed extension of the functional blocks of the CPUs 20211; 2011, the means for signaling 20215, the means for assigning 20216, the means for subjecting 20217, the means for modulating 20218a and the means for scrambling 20218b of the NB 20221 as well as the means for signaling 20215, the means for dereferencing 2015, the means for demodulating 2016a, the means for descrambling 2016b, the means for detecting 2017 and the means for testing 2018 of the UE 201 may be functionalities running on the CPUs 20211; 2011 of the NB 2021 or the UE 201, respectively, or may alternatively be separate functional entities or means. Furthermore, as indicated by the functional blocks of the means for signaling 20215 and the means for transmitting 20213 partly overlapping each other, the means for signaling 20215 may also be a functionality or a subunit of the means for transmitting 20213.

The CPUs $20x1$ (wherein x=1 and 21) may respectively be configured to process various data inputs and to control the functions of the memories $20x2$, the means for transmitting $202x3$ and the means for receiving $20x4$ (and the means for signaling 20215, the means for assigning 20216, the means for subjecting 20217, the means for modulating 20218a and the means for scrambling 20218b of the NB 20221 as well as the means for signaling 20215, the means for dereferencing 2015, the means for demodulating 2016a, the means for descrambling 2016b, the means for detecting 2017 and the means for testing 2018 of the UE 201). The memories $20x2$ may serve e.g. for storing code means for carrying out e.g. the methods according to the first example (and the second and third example to be described herein below) of the present invention, when run e.g. on the CPUs $20x1$. It is to be noted that the means for transmitting $20x3$ and the means for receiving $20x4$ may alternatively be provided as respective integral transceivers. It is further to be noted that the transmitters/receivers may be implemented i) as physical transmitters/receivers for transceiving e.g. via the air interface (e.g. in case of transmitting between the UE 201 and the NB 2021), ii) as routing entities e.g. for transmitting/receiving data packets e.g. in a PS (packet switched) network (e.g. between the several NBs 2021 (not shown) when disposed as separate network entities), iii) as functionalities for writing/reading information into/from a given memory area (e.g. in case of shared/common CPUs or memories e.g. of several NBs 2021 when disposed as an integral network entity), or iv) as any suitable combination of i) to iii).

Optionally, e.g. the means for signaling 20215 of the NB 2021 may perform signaling control information (e.g. on the PBCH or BCCH) and/or scheme information on the scheme used (e.g. on the BCCH), wherein a transmitting of signaling information by the means for transmitting 20213 (described herein below) may be performed as an auxiliary indication to the signaling performed by the means for signaling 20215. Also optionally, e.g. the means for receiving 2014 of the UE 201 may perform receiving the signaled control information (e.g. on the PBCH) and/or the signaled scheme information, wherein a detecting of a network cell type by the means for detecting 2017 (to be described herein below) may be performed based on the received control information and on the received signaling information as an auxiliary indication (and/or e.g. the signaled scheme to be used).

Optionally, e.g. the means for assigning 20216 of the NB 2021 may perform assigning a set of synchronization information (e.g. PSS/SSS pairs) to a subset of the network cells, wherein the means for subjecting 20217 may be configured to subject the signaling information to one of the modulation and scrambling only for the subset of the network cells.

Optionally, e.g. the means for subjecting 20217 of the NB 2021 may perform subjecting the signaling information (e.g. RS) to the one of modulation and scrambling. Accordingly, e.g. the means for modulating 20218a of the NB 2021 may perform modulating the signaling information (e.g. RS) by at least one predefined phase modulation, or e.g. the means for scrambling 20218b of the NB 2021 may perform scrambling the signaling information (e.g. RS) by at least one predefined scrambling sequence.

Then, e.g. the means for transmitting 2014 of the NB 2021 may perform transmitting the signaling information (e.g. RS) subjected, e.g. by the means for subjecting 20217, to the one of modulation by the at least one predefined phase modulation and scrambling by the at least one predefined scrambling sequence, the one of the modulation and scrambling being indicative of network cells (e.g. CSG cells) of the first type and network cells (e.g. non-CSG cells) of the second type different from the first type. Optionally, e.g. the means for receiving 2014 of the UE 201 may perform receiving the signaling information transmitted.

Then, optionally, e.g. the means for dereferencing 2015 of the UE 201 may perform dereferencing, from a set of synchronization information (e.g. PSS/SSS pairs), a subset of the network cells, wherein the one of the means for demodulating 2016a and the means for descrambling 2016b is configured to subject the signaling information to the one of demodulation and descrambling only for the subset of the network cells.

Accordingly, optionally, e.g. the means for demodulating 2016a of the UE 201 may perform demodulating the signaling information (e.g. RS) by the at least one predefined phase modulation. Alternatively, optionally, e.g. the means for descrambling 2016b of the UE 201 may perform descrambling the signaling information by the at least one predefined scrambling sequence.

Then, e.g. the means for detecting 2017 of the UE 201 may perform detecting the network cells (e.g. CSG cells) of the first type and the network cells (e.g. non-CSG cells) of the second type different from the first type based on the received, e.g. by the means for receiving 2014, signaling information (e.g. RS) subjected to the one of modulation by at least one predefined phase modulation and scrambling by at least one predefined scrambling sequence, the one of the modulation and scrambling being indicative of the network cells of the first type and the network cells of the second type.

Optionally, e.g. the means for testing 2018 of the UE 201 may perform testing the received signaling information against a hypothesis, e.g. for augmenting the detecting performed by the means for detecting 2017.

Figure 8:
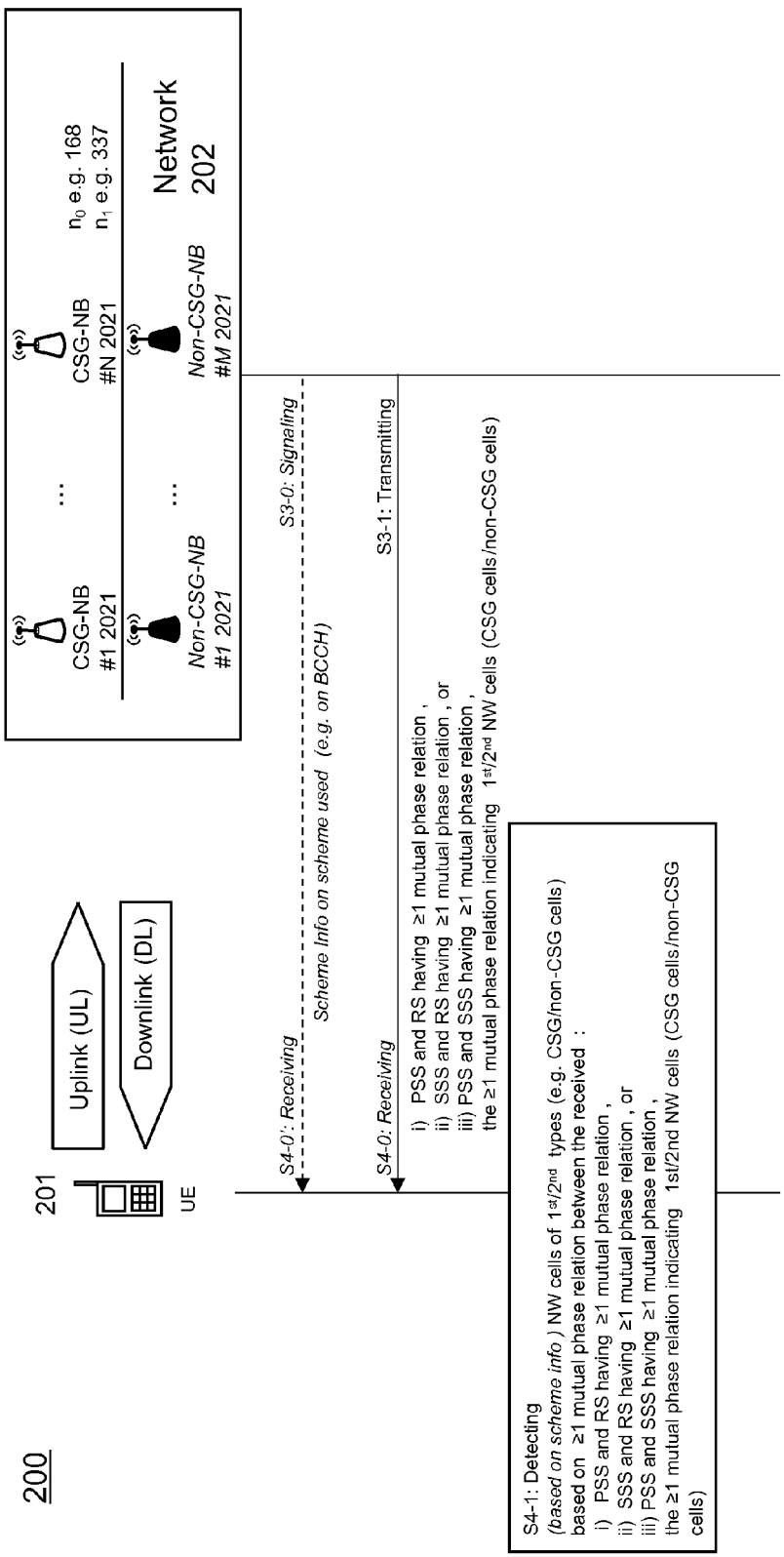
FIG. 8 shows methods for cell type detection according to the second example of the present invention deploying the fourth scheme.

FIG. 8 shows methods for cell type detection according to the second example of the present invention deploying the fourth scheme. Reference signs similar to those in FIG. 6 designate the same or similar means or portions, and description of those means or portions is not repeated for the sake of brevity.

In an optional step S3-0, e.g. the NB(s) 2021 may perform signaling scheme information on the scheme used (e.g. on the BCCH). In an optional step S4-0', e.g. the UE 201 may perform receiving the signaled scheme information. The above-described signaling of scheme information may convey information from the NB(s) 2021 to the UE 201 about which scheme to use to identify CSG cells. This may include the schemes presented here, but might also include other schemes that might be used as a supplement or alternative to the schemes presented in the examples of the present invention.

As shown in FIG. 8, in step S3-1, e.g. the NB(s) 2021 may perform transmitting one of the following:
  i) a primary synchronization signal (PSS) and a reference signal (RS), the PSS and the RS having at least one predefined phase relation to each other,
  ii) a secondary synchronization signal (SSS) and a RS, the SSS and the RS having at least one predefined phase relation to each other, or
  iii) a PSS and a SSS, the PSS and the SSS having at least one predefined phase relation to each other, the at least one phase relation being indicative of the network cells (e.g. CSG cells) of the first type and the network cells (e.g. non-CSG cells) of the second type. In an optional step S4-0, e.g. the UE 201 may perform receiving the above described pairs transmitted.

Accordingly, in step S4-1, e.g. the UE 201 may perform detecting the network cells (e.g. CSG cells) of the first type and the network cells (e.g. non-CSG cells) of the second type based on receiving one of the above defined pairs of PSS/RS, SSS/RS and PSS/SSS having the at least one predefined phase relation to each other indicative of the network cells of the $1^{st}$ and $2^{nd}$ types. Optionally, the detecting may be performed also on the signaled scheme to be used.

Figure 9:
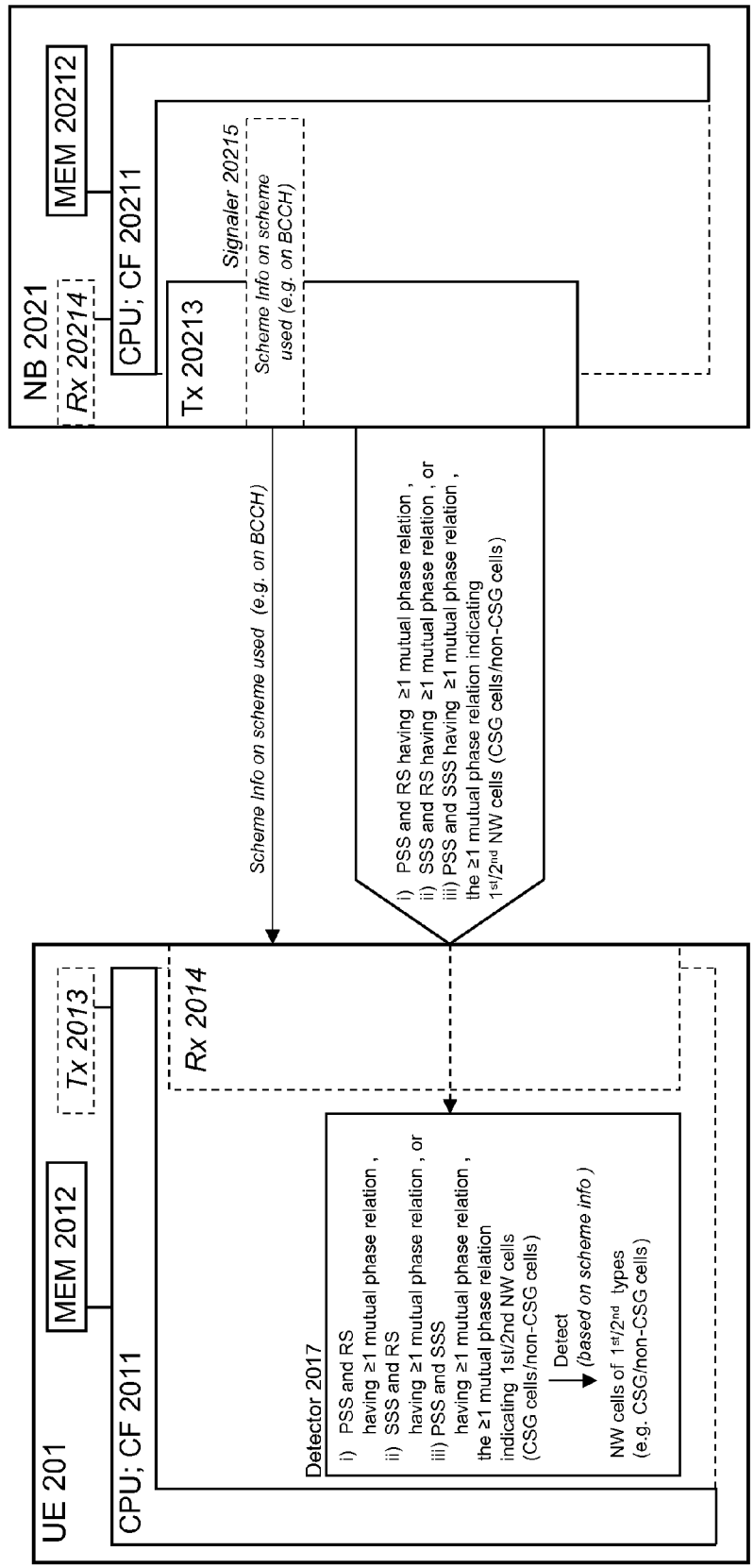
FIG. 9 shows apparatuses (e.g. UE 201 and eNB 2021) for cell type detection according to the second example of the present invention deploying the fourth scheme.

FIG. 9 shows apparatuses (e.g. UE 201 and eNB 2021) for cell type detection according to the second example of the present invention deploying the fourth scheme. Reference signs similar to those in FIG. 7 designate the same or similar means or portions, and description of those means or portions is not repeated for the sake of brevity.

Optionally, e.g. the means for signaling 20215 of the NB(s) 2021 may perform signaling scheme information on the scheme used (e.g. on the BCCH). Also optionally, e.g. the means for receiving 2014 of the UE 201 may perform receiving the signaled scheme information.

As shown in FIG. 9, e.g. the means for transmitting 20213 of the NB(s) 2021 may perform transmitting one of the following:
  i) a primary synchronization signal (PSS) and a reference signal (RS), the PSS and the RS having at least one predefined phase relation to each other,
  ii) a secondary synchronization signal (SSS) and a RS, the SSS and the RS having at least one predefined phase relation to each other, or
  iii) a PSS and a SSS, the PSS and the SSS having at least one predefined phase relation to each other, the at least one phase relation being indicative of the network cells (e.g. CSG cells) of the first type and the network cells (e.g. non-CSG cells) of the second type. Optionally, e.g. the means for receiving 2014 of the UE 201 may perform receiving the above-described pairs transmitted by the means for transmitting 20213.

Accordingly, e.g. the means for detecting 2017 of the UE 201 may perform detecting the network cells (e.g. CSG cells) of the first type and the network cells (e.g. non-CSG cells) of the second type based on receiving one of the above defined pairs of PSS/RS, SSS/RS and PSS/SSS having the at least one predefined phase relation to each other indicative of the network cells of the $1^{st}$ and $2^{nd}$ types. Optionally, the means for detecting may be configured to detect based also on the signaled scheme to be used.

Figure 10:
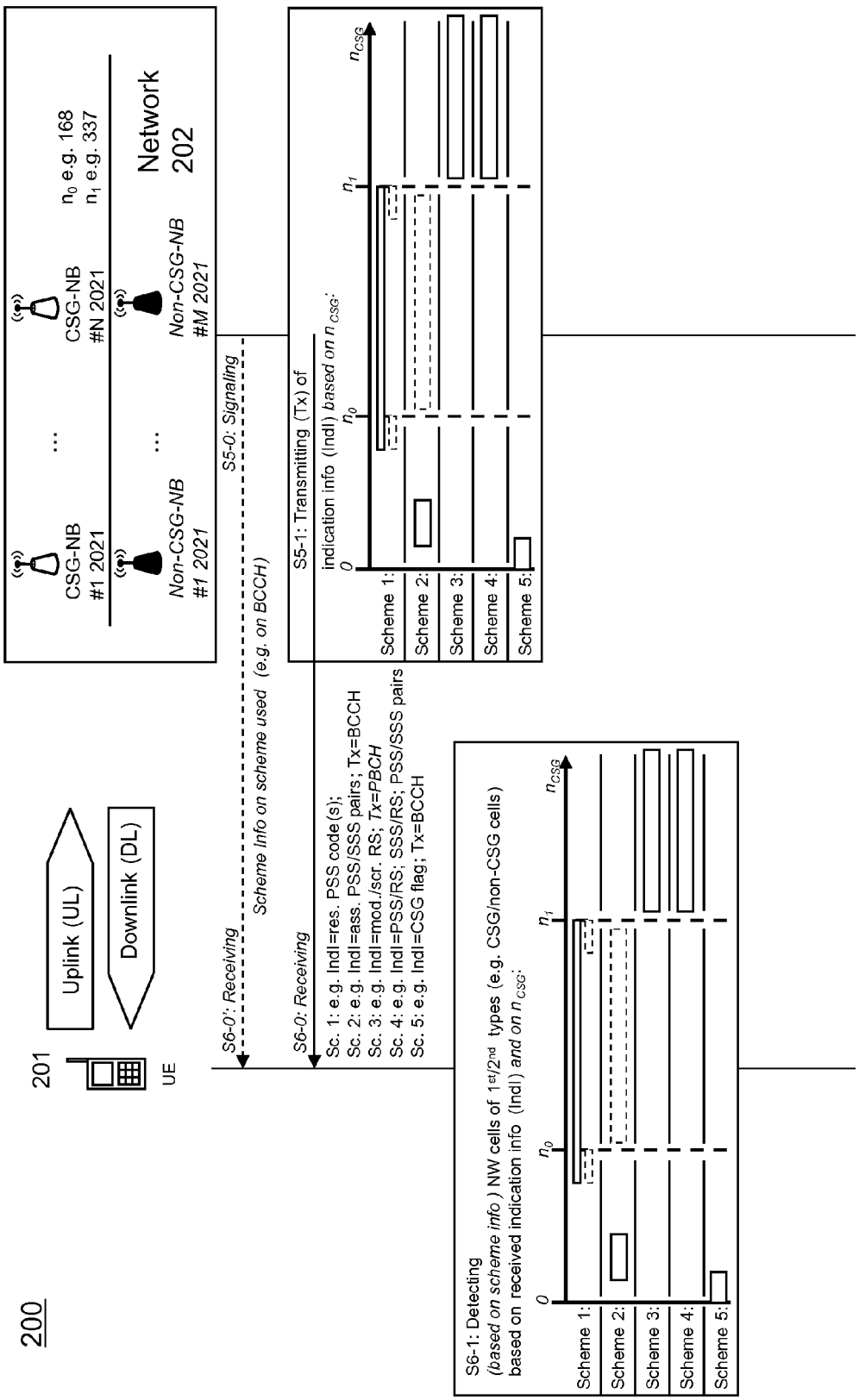
FIG. 10 shows methods for cell type detection according to a third example of the present invention deploying a combination of the first to fifth schemes.

FIG. 10 shows methods for cell type detection according to the third example of the present invention deploying a combination of the first to fifth schemes. Reference signs similar to those in FIG. 6 designate the same or similar means or portions, and description of those means or portions is not repeated for the sake of brevity.

In an optional step S5-0, e.g. the NB(s) 2021 may perform signaling scheme information on the scheme used (e.g. on the BCCH). In an optional step S6-0', e.g. the UE 201 may perform receiving the signaled scheme information.

As shown in FIG. 10, in step S5-1, e.g. the NB(s) 2021 may perform transmitting indication information indicating the network cells of the first type, the transmitting comprising:
  a) (scheme 5) broadcasting control information (e.g. BCCH), the indication information to be transmitted being an indication flag (e.g. CSG flag); and/or b) (scheme 2) assigning a set of synchronization information (e.g. PSS/SSS pairs) to the network cells of the first type, and broadcasting control information (e.g. BCCH), the indication information to be transmitted being the synchronization information; and/or c) (scheme 1) reserving at least one signaling code information (PSS code(s)) for the network cells of the first type, the indication information to be transmitted being the signaling code information; and/or d) (scheme 3) transmitting according to the above-described first example; and/or e) (scheme 4) transmitting according to the above-described second example. In an optional step S6-0, e.g. the UE 201 may perform receiving the indication information transmitted.

Accordingly, in step S6-1, e.g. the UE 201 may perform detecting the network cells (e.g. CSG cells) of the first and second types based on received indication information indicating the network cells of the first type, the detecting comprising:

a) (scheme 5) receiving broadcasted control information (e.g. BCCH), and the indication information received being an indication flag (e.g. CSG flag); and/or b) (scheme 2) dereferencing, from a set of synchronization information (PSS/SSS pairs), the network cells of the first type, and receiving broadcasted control information (BCCH), the indication information received being the synchronization information; and/or c) (scheme 1) reserving at least one signaling code information (PSS code(s)) for the network cells of the first type, the indication information received being the signaling code information; and/or d) (scheme 3) receiving according to the above-described first example; and/or e) (scheme 4) receiving according to the above-described second example. Optionally, the detecting may be performed also on the signaled scheme to be used.

As for further refinements of the above method for transmitting performed by the NB(s) 2021, the transmitting of indication information is based on a number ($n_{CSG}$) of network cell IDs for the network cells of the first type (e.g. CSG), a first number (e.g. 168) of network cell identities for the network cells of the first type (e.g. non-CSG) and a second number (e.g. 337 or 504) of network cell identities for the network cells of the first type, the number and the first and second numbers being integers equal to or greater than one, the second number being greater than the first number, wherein:

the transmitting of item a) (scheme 5) may be performed if the number is substantially equal to zero;

the transmitting of item b) (scheme 2) may be performed if the number (e.g. <<168) is significantly smaller than the first number;

the transmitting of item c) (scheme 1) may be performed if the number is substantially smaller than the first number or if the number is greater than the first number and smaller than the second number;

the transmitting of item d) (scheme 3) may be performed if the number is greater than the second number; and the transmitting of item e) (scheme 4) may be performed if the number is greater than the second number.

As for further refinements of the above method for transmitting performed by the NB(s) 2021, the transmitting of item a) may also be performed if a number of terminals of the first type substantially reaches the number of all available terminals. Furthermore, the transmitting of item b) may be performed for a subset of the network cells, if the number is greater than the first number and smaller than the second number. Moreover, the transmitting of item c) may be performed if the number is substantially smaller then the second number.

Figure 11:
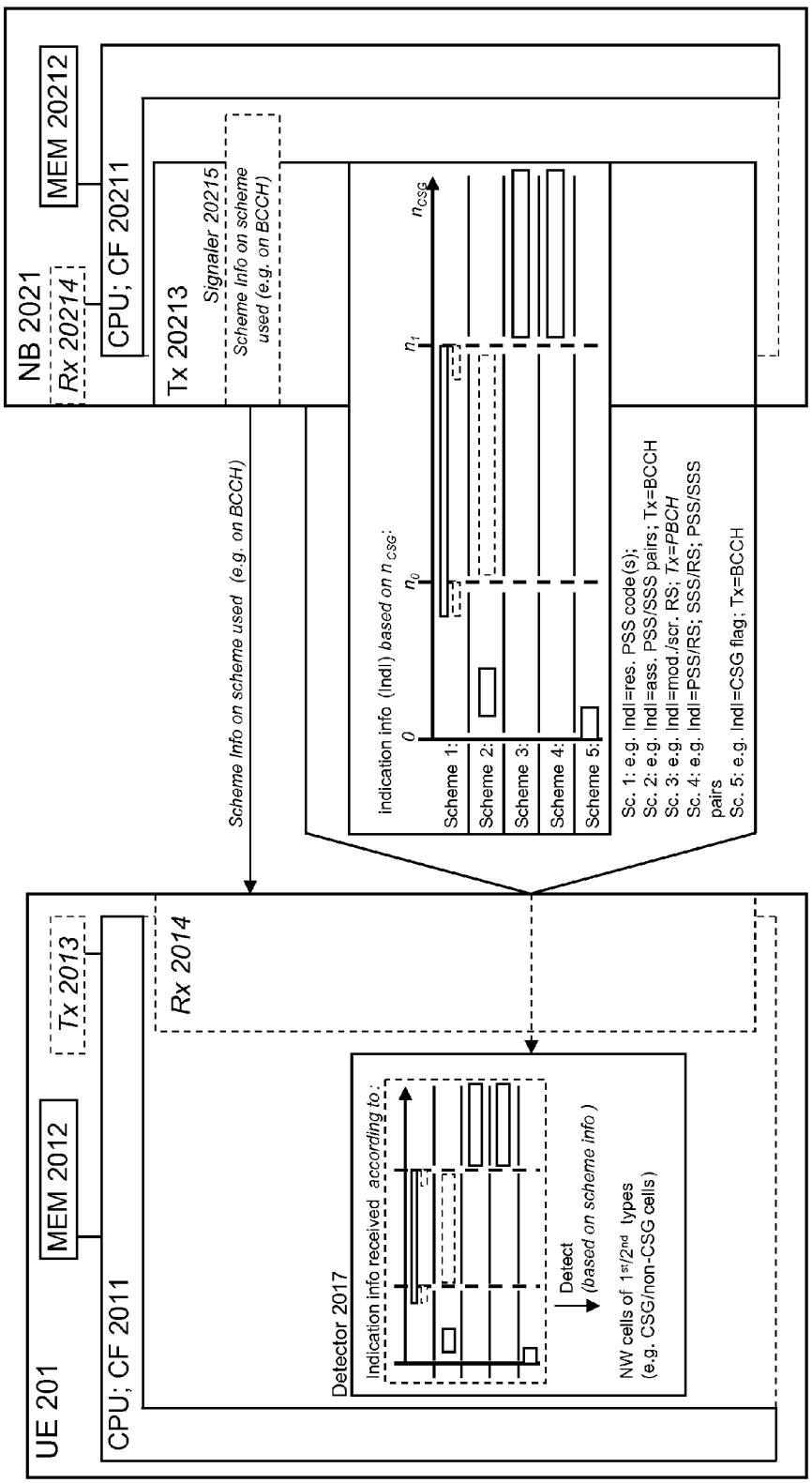
FIG. 11 shows apparatuses (e.g. UE 201 and eNB 2021) for cell type detection according to the third example of the present invention deploying the combination of the first to fifth schemes.

FIG. 11 shows apparatuses (e.g. UE 201 and eNB 2021) for cell type detection according to the third example of the present invention deploying the combination of the first to fifth schemes. Reference signs similar to those in FIG. 7 designate the same or similar means or portions, and description of those means or portions is not repeated for the sake of brevity.

Optionally, e.g. the means for signaling 20215 of the NB(s) 2021 may perform signaling scheme information on the scheme used (e.g. on the BCCH). Also optionally, e.g. the means for receiving 2014 of the UE 201 may perform receiving the signaled scheme information.

As shown in FIG. 11, e.g. the means for transmitting 20213 of the NB(s) 2021 may perform transmitting indication information indicating the network cells of the first type, the means for transmitting comprising:

a) (scheme 5) means for broadcasting control information (e.g. BCCH), the indication information to be transmitted being an indication flag (e.g. CSG flag); and/or b) (scheme 2) means for assigning a set of synchronization information (e.g. PSS/SSS pairs) to the network cells of the first type, and means for broadcasting control information (e.g. BCCH), the indication information to be transmitted being the synchronization information; and/or c) (scheme 1) means for reserving at least one signaling code information (PSS code(s)) for the network cells of the first type, the indication information to be transmitted being the signaling code information; and/or d) (scheme 3) means for transmitting according to the above-described first example; and/or e) (scheme 4) means for transmitting according to the above-described second example. Optionally, e.g. the means for receiving 2014 of the UE 201 may perform receiving the indication information transmitted by the means for transmitting 20213.

Accordingly, e.g. the means for detecting 2017 of the UE 201 may perform detecting the network cells (CSG cells) of the first and second types based on received indication information indicating the network cells of the first type, the means for detecting comprising:

a) (scheme 5) means for receiving broadcasted control information (e.g. BCCH), and the indication information received being an indication flag (e.g. CSG flag); and/or b) (scheme 2) means for dereferencing, from a set of synchronization information (PSS/SSS pairs), the network cells of the first type, and means for receiving broadcasted control information (BCCH), the indication information received being the synchronization information; and/or c) (scheme 1) means for reserving at least one signaling code information (PSS code(s)) for the network cells of the first type, the indication information received being the signaling code information; and/or d) (scheme 3) means for receiving according to the above-described first example; and/or e) (scheme 4) means for receiving according to the above-described second example. Optionally, the means for detecting 2017 of the UE 201 may be configured to detect also based on the signaled scheme to be used.

As for further refinements of the above apparatus (e.g. NB(s) 2021), the means for transmitting 20213 indication information may be configured to transmit based on the number ($n_{CSG}$) of network cell identities, the first number (e.g.

168) and the second number (e.g. 337 or 504), wherein the means for transmitting may comprise:

the means of above item a) (scheme 5) if the number is substantially equal to zero; and/or the means of above item b) (scheme 2) if the number (<<168) is significantly smaller than the first number; and/or the means of above item c) (scheme 1) if the number is substantially smaller than the first number or if the number is greater than the first number and smaller than the second number; and/or the means of above item d) (scheme 3) if the number is greater than the second number; and/or the means of above item e) (scheme 4) if the number is greater than the second number.

As for further refinements of the above apparatus (e.g. NB(s) 2021), the means for transmitting of item a) may also be configured to transmit if a number of terminals of the first type substantially reaches the number of all available terminals. Furthermore, the means for transmitting of item b) may be configured to transmit for a subset of the network cells, if the number is greater than the first number and smaller than the second number. Moreover, the means for transmitting of item c) may be configured to transmit if the number is substantially smaller then the second number.

As for further refinements of the above methods and apparatuses according to the first to third examples, the signaling information may be constituted by a reference signal. Further, the network cells of the first type may be constituted by closed subscriber group network cells, and the network cells of the second type may be constituted by one of non-closed subscriber group network cells and macro cells. Still further, the set of synchronization information may be constituted by pairs of a primary synchronization signal and a secondary synchronization signal. Moreover, the control information may be constituted by a broadcast control channel or a physical broadcast channel. In addition, the first number may be 168, and the second number may be 337 or 504. Further, the indication flag may be constituted by a closed subscriber group flag. Finally, the signaling code information may be constituted by a primary synchronization signal code.

Furthermore, at least one of, or more of means for transmitting 20213, means for subjecting 20217, means for modulating 20218*a*, means for scrambling 20218*b*, means for assigning 20216, means for signaling 20215, means for detecting 2017, means for demodulating 2016*a*, means for descrambling 2017*b*, means for dereferencing 2015, means for receiving 2014, means for testing 2018 and/or the NB(s) 2021 and/or the UE 201, or the respective functionalities carried out, may be implemented as a chipset or module.

Finally, the present invention also relates to a system which may comprise one or more home evolved node B according to any one of the above-described first to third examples, and a user equipment according to any one of the above-described first to third examples.

Without being restricted to the details following in this section, the embodiment of the present invention may be summarized as follows:

In order to provide an efficient and flexible method for distinguishing between CSG cells and macro cells, the network may configure UEs with one of the following schemes. This signaling may be conveyed over wide area cells via the BCCH and can also include the details of the configured distinction scheme:

1.

Reserve one (or two) PSS code(s) for CSG cells—with this solution, the CSG cells may be identified already in the first stage of cell search, and therefore non-CSG UEs may avoid searching for that PSS code altogether. This scheme may be applicable in cases where there is a need for a large number of CSG cells and the number of CSG cells is close to 168 (1 reserved PSS for CSG) or greater than 168 and less than 337 (or close to 337, i.e. 2 reserved PSS codes for SCG).

2.

Reserve a certain (e.g. consecutive or non-consecutive) range of cell IDs for CSG and signal via the BCCH the reserved range. In this scheme, a cell type may be indentified via a PSS and SSS pair, thus a full cell search may be required. This scheme may be applicable in cases where the number of CSG cells and the required number of CSG cell IDs is relatively small, i.e. <<168. Another scenario is the case where the number of CSG cell IDs needs to be larger than 168 but less than 337, because the remaining IDs may be required for other purposes, i.e. it is neither possible to reserve only one PSS code (too few IDs) nor to fully reserve two PSS codes (too many IDs, or more specifically too few IDs remaining for other purposes). In this case, it is already possible to determine the cell type (CSG or non-CSG) for two of the three PSS codes (e.g. PSS 0 indicates CSG, PSS 1 indicates non-CSG), while only for the third PSS, also the SSS needs to be investigated, so the extra complexity of detection the SSS may only required in a subset of the cases. This can be used during a deployment, i.e. the "unique" PSS (or the several unique PSS) may be prioritized (used more often) when assigning PSS and SSS to cells during cell configuration.

3.

Detect a CSG cell via a phase modulation on the RS (relative to the PSS/SSS/data phase) or via a different RS scrambling sequence. In this scheme, a CSG cell may be detected after cell search but prior to any transport channel decoding e.g. via hypotheses testing on the RS (e.g. phase A or B, RS scrambling sequence A or B) or in the process of PBCH decoding (PBCH decoding may fail with a wrong hypothesis on the RS phase/RS scrambling sequence). This scheme is also applicable if 504 additional cell IDs (as many as the current number of all cell IDs c.f. e.g. TS 36.211 v8.2.0) can be provided for CSG without additional or reserved PSS/SSS codes. Further, the required number of cell IDs for CSG may be greater than 336. Alternatively, only a certain range of PSS/SSSs may be used for CSG in which case, the blind detection on the RS may be executed only for these specific PSS/SSS pairs to check if this cell is CSG or macro, while all other PSS/SSS pairs may indicate a macro cell. Alternatively, this scheme may be used as an auxiliary indication of CSG on top of signaling on the BCCH. This scheme is also applicable to two different sets of RS scrambling sequences (e.g. 504 RS sequences for CSG and another 504 RS sequences for non-CSG), wherein non-CSG UEs may not have to perform the blind detection at all, i.e. if a CSG cell is measured, but the UE assumes it is a macro cell, then the UE may not detect any energy in the RSRP/RSRQ measurements (due to a wrong assumed RS sequence) and may stop measurements and the UE may not select/reselect/handover (to) such a cell.

4.

Use a defined phase relation between PSS relative to RS and/or SSS relative to RS or a defined phase relation between PSS and SSS to indicate CSG. This scheme is also applicable to legacy eNBs which may "accidentally" use a specific phase relation, since it may be advertised on the BCCH whether this can be used for early CSG selection.

5.

Rely on BCCH decoding and the CSG flag to detect the cell type. This scheme is applicable when nearly none (or none) of the cells are CSG or most of UEs (or all UEs) are CSG. Similar as with above schemes, the use of this scheme may be signaled on the BCCH and may be used for configuration by an operator, if no CSG cells are deployed on the same carrier by this operator.

It should be noted that the above schemes 1 to 5 may allow configuration of the parameters that indicate CSG, or even allow the configuration of one out of multiple schemes (to be applied to distinguish CSG cells and non CSG cells) in order to be able to select the optimum configuration, which depends on the number of CSG cells (or the fraction of cells using CSG) and the network topology. This is applicable, since today, it is hard to predict how widespread CSG is going to be.

The support for CSG is being standardized for the UE, while the behavior of the network remains unaddressed. Therefore, according to the above schemes, it may be safer to provide some flexibility in order to be then able to pick am applicable selection eventually when rolling out the networks.

Furthermore, there always may be the fall back operation to detect CSG via an indication on the BCCH, which may be the simplest concept, but does not allow any power saving due to early detection as discussed hereinabove. However, it is applicable to have these power saving options at hand, in particular for UEs that are built later, when CSG may become a more widespread used feature and therefore, power saving is more important in this case. So the support of the early CSG detection may be optional, at least initially.

From the UE implantation point of view, selecting between schemes 1, 2 and 5 via signaling may be applicable. In this case, no hardware changes and only small software changes are needed, and the CSG detection may be preformed early during the cell search and neighbor cell measurement phase and with minimal complexity. This example also provides much flexibly for an operator with respect to the number of deployed CSG cells. In case the number of CSG cells is large, a cell type may be detected already in first cell search step (scheme 1), thus minimizing the negative impact of CSG cells to non-CSG UEs. Contrary, if the number of CSG cells is quite low, there may be no need to reserve SSS and/or PSS codes. This simplifies network planning for the operator and CSG may be configured to be signaled via the BCCH. So the invention provides a scheme that is flexible enough to support efficiently both scenarios with high or low number of CSG cells and/or CSG UEs.

From the network point of view, schemes 3 or 4 may be applicable, as they do not reduce the number of cell IDs for macro cells (and allow also the same maximum number of cell IDs for CSG cells).

FURTHER EXAMPLES

For the purpose of the present invention as described herein above, it should be noted that an access technology may be any technology by means of which a user equipment can access an access network (or base station, respectively). Any present or future technology, such as WiMAX (Worldwide Interoperability for Microwave Access) or WLAN (Wireless Local Access Network), Blue-Tooth, Infrared, and the like may be used; although the above technologies are mostly wireless access technologies, e.g. in different radio spectra, access technology in the sense of the present invention may also imply wirebound technologies, e.g. IP based access technologies like cable networks or fixed line.

a network may be any device, unit or means by which a station entity or other user equipment may connect to and/or utilize services offered by the access network; such services include, among others, data and/or (audio-) visual communication, data download etc.;

generally, the present invention may be applicable in those network/user equipment environments relying on a data packet based transmission scheme according to which data are transmitted in data packets and which are, for example, based on the Internet Protocol IP. The present invention is, however, not limited thereto, and any other present or future IP or mobile IP (MIP) version, or, more generally, a protocol following similar principles as (M)IPv4/6, is also applicable;

a user equipment may be any device, unit or means by which a system user may experience services from an access network;

method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, units or means likely to be implemented as hardware components at the NB(s) and/or UE, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may alternatively be based on any security architecture capable e.g. of authentication, authorization, keying and/or traffic protection;

devices, units or means (e.g. NB(s) and/or UE, or any one of their respective means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

Although the present invention has been described herein before with reference to particular embodiments thereof, the present invention is not limited thereto and various modification can be made thereto.

For ease of clarity, the following table provides a survey of the abbreviations used in the above description. It is to be noted that an "s" following an abbreviation represents the plural of that abbreviation, e.g. "UEs" represents "user equipments".

3GPP 3rd generation partnership project
TR/TS Technical report/technical specification
UE User equipment
CS Circuit switched
PS Packet switched
UL Uplink
DL Downlink
MBMS multimedia broadcast/multicast service
MBSFN MBMS single frequency network
FDD Frequency division duplex
TDD Time division duplex (TDD)
BCCH Broadcast Control Channel
DL-SCH Downlink shared channel
PDSCH physical DL shared channel
CSG Closed Subscriber Group
UMTS universal mobile telecommunications system
UTRAN UMTS terrestrial radio access network
E-UTRAN Evolved UTRAN
eNB Evolved Node B
HeNB Home eNode B
ID Identity
LTE Long Term Evolution
MIMO Multiple-Input Multiple-Output
OFDM Orthogonal Frequency Division Multiplexing
P-BCH Physical Broadcast Channel
PSC Primary Synchronization Code
PSS Primary Synchronization Signal
SSC Secondary Synchronization Code
SSS Secondary Synchronization Signal
RS Reference Signal
RSRP Reference Signal Received Power
RSRQ Reference Signal Received Quality
UTRAN UMTS Terrestrial Radio Access Network

The invention claimed is:

1. A method comprising:
subjecting signaling information to one of modulation by at least one predefined phase modulation and scrambling by at least one predefined scrambling sequence, the one of the modulation and scrambling being indicative of network cells of a first type, said network cells of the first type being constituted by closed subscriber group network cells, and network cells of a second type different from the first type; and
transmitting the signaling information to identify closed subscriber group network cells.

2. The method according to claim 1, further comprising modulating the signaling information by the at least one predefined phase modulation.

3. The method according to claim 1, further comprising scrambling the signaling information by the at least one predefined scrambling sequence.

4. The method according to claim 1, further comprising assigning a set of synchronization information to a subset of the network cells, wherein the signaling information is subjected to the one of the modulation and scrambling only for the subset of the network cells.

5. The method according to claim 1, further comprising signaling control information, wherein the transmitting is performed as an auxiliary indication to the signaling.

6. A method comprising:
transmitting one of the following:
i) a primary synchronization signal and a reference signal, the primary synchronization signal and the reference signal having at least one predefined phase relation to each other,
ii) a secondary synchronization signal and a reference signal, the secondary synchronization signal and the reference signal having at least one predefined phase relation to each other, or
iii) a primary synchronization signal and a secondary synchronization signal, the primary synchronization signal and the secondary synchronization signal having at least one predefined phase relation to each other,
the at least one phase relation being indicative of network cells of a first type, said network cells of the first type being constituted by closed subscriber group network cells, and network cells of a second type different from the first type, the method being to identify closed subscriber group network cells.

7. A method comprising:
transmitting indication information indicating network cells of a first type, said network cells of the first type being constituted by closed subscriber group network cells, the network cells being different from network cells of a second type, the transmitting comprising at least one of the following:
a) broadcasting control information, the indication information to be transmitted being an indication flag, said indication flag being constituted by a closed subscriber group flag;
b) assigning a set of synchronization information to the network cells of the first type, and broadcasting control information, the indication information to be transmitted being the synchronization information;
c) reserving at least one signaling code information for the network cells of the first type, the indication information to be transmitted being the signaling code information;
d) transmitting signaling information subjected to one of modulation by at least one predefined phase modulation and scrambling by at least one predefined scrambling sequence, the one of the modulation and scrambling being indicative of the network cells of a first type and the network cells of a second type different from the first type; and
e) transmitting one of the following:
i) a primary synchronization signal and a reference signal, the primary synchronization signal and the reference signal having at least one predefined phase relation to each other,
ii) a secondary synchronization signal and a reference signal, the secondary synchronization signal and the reference signal having at least one predefined phase relation to each other, or
iii) a primary synchronization signal and a secondary synchronization signal, the primary synchronization signal and the secondary synchronization signal having at least one predefined phase relation to each other,
the at least one phase relation being indicative of the network cells of a first type and the network cells of a second type different from the first type, the method being to identify closed subscriber group network cells.

8. The method according to claim 7, wherein the transmitting of indication information is based on a number of network cell identities for the network cells of the first type, a first number of network cell identities for the network cells of the first type and a second number of network cell identities for the network cells of the first type, the number and the first and second numbers being integers equal to or greater than one, the second number being greater than the first number, wherein:

the transmitting of item a) is performed if the number is substantially equal to zero;

the transmitting of item b) is performed if the number is significantly smaller than the first number;

the transmitting of item c) is performed if the number is substantially smaller than the first number or if the number is greater than the first number and smaller than the second number;

the transmitting of item d) is performed if the number is greater than the second number; and the transmitting of item e) is performed if the number is greater than the second number.

9. The method according to claim 8, wherein the transmitting of item a) is also performed if a number of terminals of the first type substantially reaches the number of all available terminals.

10. The method according to claim 8, wherein the transmitting of item b) is performed for a subset of the network cells, if the number is greater than the first number and smaller than the second number.

11. The method according to claim 8, wherein the transmitting of item c) is performed if the number is substantially smaller than the second number.

12. The method according to claim 1, further comprising signaling scheme information on a scheme to be used.

13. A method comprising:

receiving signaling information subjected to one of modulation by at least one predefined phase modulation and scrambling by at least one predefined scrambling sequence, the one of the modulation and scrambling being indicative of network cells of a first type, said network cells of the first type being constituted by closed subscriber group network cells, and network cells of a second type different from the first type; and detecting network cells of the first type based on the received signaling information to identify closed subscriber group network cells.

14. The method according to claim 13, further comprising descrambling the signaling information by the at least one predefined scrambling sequence.

15. The method according to claim 13, further comprising demodulating the signaling information by the at least one predefined phase modulation.

16. The method according to claim 13, wherein the detecting further comprises testing the received signaling information against a hypothesis.

17. The method according to claim 13, further comprising dereferencing, from a set of synchronization information, a subset of the network cells, wherein the signaling information is subjected to one of demodulation and descrambling only for the subset of the network cells.

18. The method according to claim 13, further comprising receiving signaled control information, wherein the detecting is performed based on the received control information and on the received signaling information as an auxiliary indication.

19. A method comprising:

detecting network cells of a first type, said network cells of the first type being constituted by closed subscriber group network cells, and network cells of a second type different from the first type based on receiving one of the following:

i) a primary synchronization signal and a reference signal, the primary synchronization signal and the reference signal having at least one predefined phase relation to each other, ii) a secondary synchronization signal and a reference signal, the secondary synchronization signal and the reference signal having at least one predefined phase relation to each other, or iii) a secondary synchronization signal and a primary synchronization signal, the primary synchronization signal and the secondary synchronization signal having at least one predefined phase relation to each other, the at least one phase relation being indicative of the network cells of a first type and the network cells of a second type different from the first type, the method being to identify closed subscriber group network cells.

20. A method comprising:

detecting network cells of a first type, said network cells of the first type being constituted by closed subscriber group network cells, and network cells of a second type different from the first type based on received indication information indicating the network cells of the first type, the detecting comprising at least one of the following:

a) receiving broadcasted control information, and the indication information received being an indication flag, said indication flag being constituted by a closed subscriber group flag;

b) dereferencing, from a set of synchronization information, the network cells of the first type, and receiving broadcasted control information, the indication information received being the synchronization information;

c) reserving at least one signaling code information for the network cells of the first type, the indication information received being the signaling code information;

d) receiving signaling information subjected to one of modulation by at least one predefined phase modulation and scrambling by at least one predefined scrambling sequence, the one of the modulation and scrambling being indicative of the network cells of the first type and the network cells of the second type; and e) receiving one of the following:

i) a primary synchronization signal and a reference signal, the primary synchronization signal and the reference signal having at least one predefined phase relation to each other, ii) a secondary synchronization signal and a reference signal, the secondary synchronization signal and the reference signal having at least one predefined phase relation to each other, or iii) a secondary synchronization signal and a primary synchronization signal, the primary synchronization signal and the secondary synchronization signal having at least one predefined phase relation to each other, the at least one phase relation being indicative of the network cells of the first type and the network cells of the second type different from the first type, the method being to identify closed subscriber group network cells.

21. The method according to claim 1, wherein at least one of the following applies: the signaling information is constituted by a reference signal; the network cells of the second type are constituted by one of non-closed subscriber group network cells and macro cells; the set of synchronization information is constituted by pairs of a primary synchronization signal and a secondary synchronization signal; and the control information is constituted by a one of a broadcast control channel and a primary broadcast channel.

22. The method according to claim 6, wherein the network cells of the second type are constituted by one of non-closed subscriber group network cells and macro cells.

23. The method according to claim 7, wherein at least one of the following applies: the signaling information is constituted by a reference signal; the network cells of the second type are constituted by one of non-closed subscriber group network cells and macro cells; the set of synchronization information is constituted by pairs of a primary synchronization signal and a secondary synchronization signal; the control information is constituted by a one of a broadcast control channel and a primary broadcast channel; the first number is 168; the second number is one of 337 and 504; and the signaling code information is constituted by a primary synchronization signal code.

24. The method according to claim 13, further comprising receiving signaled scheme information on a scheme used, wherein the detecting is performed based on the signaled scheme to be used.

25. An apparatus comprising:
one or more processors; and
one or more memories including computer program code, the one or more memories and the computer program code configured, with the one or more processors, to cause the apparatus to perform at least the following:
subjecting signaling information to one of modulation by at least one predefined phase modulation and scrambling by at least one predefined scrambling sequence, the one of the modulation and scrambling being indicative of network cells of a first type, said network cells of the first type being constituted by closed subscriber group network cells, and network cells of a second type different from the first type; and
transmitting the signaling information to identify closed subscriber group network cells.

26. The apparatus according to claim 25, wherein the one or more memories and the computer program code are further configured, with the one or more processors, to cause the apparatus to perform:
modulating the signaling information by the at least one predefined phase modulation.

27. The apparatus according to claim 25, wherein the one or more memories and the computer program code are further configured, with the one or more processors, to cause the apparatus to perform:
scrambling the signaling information by the at least one predefined scrambling sequence.

28. The apparatus according to claim 25, wherein the one or more memories and the computer program code are further configured, with the one or more processors, to cause the apparatus to perform:
assigning a set of synchronization information to a subset of the network cells, and subjecting the signaling information to the one of the modulation and scrambling only for the subset of the network cells.

29. The apparatus according to claim 25, wherein the one or more memories and the computer program code are further configured, with the one or more processors, to cause the apparatus to perforin:
signaling control information, and transmitting is an auxiliary indication to the signaling.

30. An apparatus comprising:
one or more processors; and
one or more memories including computer program code, the one or more memories and the computer program code configured, with the one or more processors, to cause the apparatus to perform at least the following:
transmitting one of the following:
i) a primary synchronization signal and a reference signal, the primary synchronization signal and the reference signal having at least one predefined phase relation to each other,
ii) a secondary synchronization signal and a reference signal, the secondary synchronization signal and the reference signal having at least one predefined phase relation to each other, or
iii) a primary synchronization signal and a secondary synchronization signal, the primary synchronization signal and the secondary synchronization signal having at least one predefined phase relation to each other,
the at least one phase relation being indicative of network cells of a first type, said network cells of the first type being constituted by closed subscriber group network cells, and network cells of a second type different from the first type, the apparatus being to identify closed subscriber group network cells.

31. An apparatus comprising:
one or more processors; and
one or more memories including computer program code, the one or more memories and the computer program code configured, with the one or more processors, to cause the apparatus to perform at least the following:
transmitting indication information indicating network cells of a first type, said network cells of the first type being constituted by closed subscriber group network cells, the network cells being different from network cells of a second type, transmitting further comprising at least one of the following:
a) broadcasting control information, the indication information to be transmitted being an indication flag, said indication flag being constituted by a closed subscriber group flag;
b) assigning a set of synchronization information to the network cells of the first type, and broadcasting control information, the indication information to be transmitted being the synchronization information;
c) reserving at least one signaling code information for the network cells of the first type, the indication information to be transmitted being the signaling code information;
d) transmitting signaling information subjected to one of modulation by at least one predefined phase modulation and scrambling by at least one predefined scrambling sequence, the one of the modulation and scrambling being indicative of the network cells of a first type and the network cells of a second type different from the first type; and
e) transmitting one of the following:
i) a primary synchronization signal and a reference signal, the primary synchronization signal and the reference signal having at least one predefined phase relation to each other,
ii) a secondary synchronization signal and a reference signal, the secondary synchronization signal and the reference signal having at least one predefined phase relation to each other, or
iii) a primary synchronization signal and a secondary synchronization signal, the primary synchronization signal and the secondary synchronization signal having at least one predefined phase relation to each other,
the at least one phase relation being indicative of the network cells of the first type and the network cells of the second type different from the first type, the apparatus being to identify closed subscriber group network cells.

32. The apparatus according to claim 31, wherein transmitting of indication information is based on a number of network cell identities for the network cells of the first type, a first number of network cell identities for the network cells of the first type and a second number of network cell identities for the network cells of the first type, the number and the first and second numbers being integers equal to or greater than one, the second number being greater than the first number, wherein transmitting comprises at least one of the following:
  item a) if the number is substantially equal to zero;
  item b) if the number is significantly smaller than the first number;
  item c) if the number is substantially smaller than the first number or if the number is greater than the first number and smaller than the second number;
  item d) if the number is greater than the second number; and
  item e) if the number is greater than the second number.

33. The apparatus according to claim 32, wherein transmitting of item a) is also done if a number of terminals of the first type substantially reaches the number of all available terminals.

34. The apparatus according to claim 32, wherein transmitting of item b) is done for a subset of the network cells, if the number is greater than the first number and smaller than the second number.

35. The apparatus according to claim 32, wherein transmitting of item c) is done if the number is substantially smaller than the second number.

36. The apparatus according to claim 25, wherein the one or more memories and the computer program code are further configured, with the one or more processors, to cause the apparatus to perform:
  signaling scheme information on a scheme to be used.

37. An apparatus comprising:
  one or more processors; and
  one or more memories including computer program code, the one or more memories and the computer program code configured, with the one or more processors, to cause the apparatus to perform at least the following:
  receiving signaling information subjected to one of modulation by at least one predefined phase modulation and scrambling by at least one predefined scrambling sequence, the one of the modulation and scrambling being indicative of network cells of a first type, said network cells of the first type being constituted by closed subscriber group network cells, and network cells of a second type different from the first type; and
  detecting network cells of the first type based on the received signaling information, the apparatus being to identify closed subscriber group network cells.

38. The apparatus according to claim 37, wherein the one or more memories and the computer program code are further configured, with the one or more processors, to cause the apparatus to perform:
  descrambling the signaling information by the at least one predefined scrambling sequence.

39. The apparatus according to claim 37, wherein the one or more memories and the computer program code are further configured, with the one or more processors, to cause the apparatus to perform:
  demodulating the signaling information by the at least one predefined phase modulation.

40. The apparatus according to claim 37, wherein detecting further comprises testing the received signaling information against a hypothesis.

41. The apparatus according to claim 38, wherein the one or more memories and the computer program code are further configured, with the one or more processors, to cause the apparatus to perform:
  dereferencing, from a set of synchronization information, a subset of the network cells, wherein the demodulating and the descrambling the signaling information is only for the subset of the network cells.

42. The apparatus according to claim 37, wherein the one or more memories and the computer program code are further configured, with the one or more processors, to cause the apparatus to perform:
  receiving signaled control information, wherein detecting is based on the control information received and on the signaling information received as an auxiliary indication.

43. An apparatus comprising:
  one or more processors; and
  one or more memories including computer program code, the one or more memories and the computer program code configured, with the one or more processors, to cause the apparatus to perform at least the following:
  detecting network cells of a first type, said network cells of the first type being constituted by closed subscriber group network cells, and network cells of a second type different from the first type based on receiving one of the following:
  i) a primary synchronization signal and a reference signal, the primary synchronization signal and the reference signal having at least one predefined phase relation to each other,
  ii) a secondary synchronization signal and a reference signal, the secondary synchronization signal and the reference signal having at least one predefined phase relation to each other, or
  iii) a primary synchronization signal and a secondary synchronization signal, the primary synchronization signal and the secondary synchronization signal having at least one predefined phase relation to each other,
  the at least one phase relation being indicative of the network cells of the first type and the network cells of the second type, the apparatus being to identify closed subscriber group network cells.

44. An apparatus comprising:
  one or more processors; and
  one or more memories including computer program code, the one or more memories and the computer program code configured, with the one or more processors, to cause the apparatus to perform at least the following:
  detecting network cells of a first type, said network cells of the first type being constituted by closed subscriber group network cells, and network cells of a second type different from the first type based on received indication information indicating the network cells of the first type, the detecting comprising at least one of the following:
  a) the indication information received being an indication flag, said indication flag being constituted by a closed subscriber group flag;
  b) dereferencing, from a set of synchronization information, the network cells of the first type, and receiving broadcasted control information, the indication information received being the synchronization information;
  c) reserving at least one signaling code information for the network cells of the first type, the indication information received being the signaling code information;
  d) receiving based on received signaling information subjected to one of modulation by at least one predefined phase modulation and scrambling by at least one predefined scrambling sequence, the one of the modulation and scrambling being indicative of the network cells of the first type and the network cells of the second type; and e) receiving one of the following:
  i) a primary synchronization signal and a reference signal, the primary synchronization signal and the reference signal having at least one predefined phase relation to each other,
  ii) a secondary synchronization signal and a reference signal, the secondary synchronization signal and the reference signal having at least one predefined phase relation to each other, or
  iii) a primary synchronization signal and a secondary synchronization signal, the primary synchronization signal and the secondary synchronization signal having at least one predefined phase relation to each other,
  the at least one phase relation being indicative of the network cells of the first type and the network cells of the second type, the apparatus being to identify closed subscriber group network cells.

45. The apparatus according to claim 25, wherein at least one of the following applies: the signaling information is constituted by a reference signal; the network cells of the second type are constituted by one of non-closed subscriber group network cells and macro cells; the set of synchronization information is constituted by pairs of a primary synchronization signal and a secondary synchronization signal; and the control information is constituted by a one of a broadcast control channel and a primary broadcast channel.

46. The apparatus according to claim 30, wherein the network cells of the second type are constituted by one of non-closed subscriber group network cells and macro cells.

47. The apparatus according to claim 31, wherein at least one of the following applies: the signaling information is constituted by a reference signal; the network cells of the second type are constituted by one of non-closed subscriber group network cells and macro cells; the set of synchronization information is constituted by pairs of a primary synchronization signal and a secondary synchronization signal; the control information is constituted by a one of a broadcast control channel and a primary broadcast channel; the first number is 168; the second number is one of 337 and 504; and the signaling code information is constituted by a primary synchronization signal code.

48. The apparatus according to claim 25, wherein the one or more memories and the computer program code are further configured, with the one or more processors, to cause the apparatus to perform:
  receiving signaled scheme information on a scheme used, wherein detecting is based on the signaled scheme to be used.

49. The apparatus according to claim 25, wherein the apparatus is constituted by a one of a home evolved node B and a macro cell node B.

50. The apparatus according to claim 37, wherein the apparatus is constituted by a user equipment.

51. The apparatus according to claim 25, wherein the apparatus is implemented as a chipset or module.

52. A computer program product comprising a non-transitory computer-readable storage medium bearing computer program code embodied therein for use with a computer, the computer program code comprising code for performing the method according to claim 1.

53. The apparatus according to claim 43, wherein the network cells of the second type are constituted by one of non-closed subscriber group network cells and macro cells.

54. The method according claim 13, wherein at least one of the following applies: the signaling information is constituted by a reference signal; the network cells of the second type are constituted by one of non-closed subscriber group network cells and macro cells; the set of synchronization information is constituted by pairs of a primary synchronization signal and a secondary synchronization signal; and the control information is constituted by a one of a broadcast control channel and a primary broadcast channel.

55. The method according to claim 20, wherein at least one of the following applies: the signaling information is constituted by a reference signal; the network cells of the second type are constituted by one of non-closed subscriber group network cells and macro cells; the set of synchronization information is constituted by pairs of a primary synchronization signal and a secondary synchronization signal; the control information is constituted by a one of a broadcast control channel and a primary broadcast channel; the first number is 168; the second number is one of 337 and 504; and the signaling code information is constituted by a primary synchronization signal code.

56. The apparatus according to claim 37, wherein at least one of the following applies: the signaling information is constituted by a reference signal; the network cells of the second type are constituted by one of non-closed subscriber group network cells and macro cells; the set of synchronization information is constituted by pairs of a primary synchronization signal and a secondary synchronization signal; and the control information is constituted by a one of a broadcast control channel and a primary broadcast channel.

57. The apparatus according to claim 44, wherein at least one of the following applies: the signaling information is constituted by a reference signal; the network cells of the second type are constituted by one of non-closed subscriber group network cells and macro cells; the set of synchronization information is constituted by pairs of a primary synchronization signal and a secondary synchronization signal; the control information is constituted by a one of a broadcast control channel and a primary broadcast channel; the first number is 168; the second number is one of 337 and 504; and the signaling code information is constituted by a primary synchronization signal code.

58. The apparatus according to claim 45, wherein the apparatus is constituted by a one of a home evolved node B and a macro cell node B.

59. The method according to claim 19, wherein the network cells of the second type are constituted by one of non-closed subscriber group network cells and macro cells.

60. The apparatus according to claim 25, wherein the apparatus is constituted by a user equipment.

61. The apparatus according to claim 31, wherein the apparatus is constituted by a user equipment.

62. The apparatus according to claim 44, wherein the apparatus is constituted by a user equipment.

* * * * *

UNITED STATES PATENT AND TRADEMARK OFFICE
CERTIFICATE OF CORRECTION

PATENT NO.        : 8,824,533 B2                                                     Page 1 of 1
APPLICATION NO.   : 13/000719
DATED             : September 2, 2014
INVENTOR(S)       : Chmiel et al.

It is certified that error appears in the above-identified patent and that said Letters Patent is hereby corrected as shown below:

In the Claims

Claim 29, col. 29, line 55 "perforin" should be deleted and --perform-- should be inserted.

Signed and Sealed this
Eighteenth Day of November, 2014

Michelle K. Lee
*Deputy Director of the United States Patent and Trademark Office*